(12) United States Patent
Eim et al.

(10) Patent No.: US 9,983,724 B2
(45) Date of Patent: *May 29, 2018

(54) MOBILE TERMINAL AND CONTROLLING METHOD FOR DISPLAYING INFORMATION OF A WEARABLE DEVICE

(71) Applicant: LG ELECTRONICS INC., Seoul (KR)

(72) Inventors: Sanghyun Eim, Seoul (KR); Jumin Chi, Seoul (KR); Gukchan Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 29 days.

This patent is subject to a terminal disclaimer.

(21) Appl. No.: 15/208,504

(22) Filed: Jul. 12, 2016

(65) Prior Publication Data
US 2016/0320909 A1 Nov. 3, 2016

Related U.S. Application Data

(63) Continuation of application No. 14/614,130, filed on Feb. 4, 2015, now Pat. No. 9,426,275.

(30) Foreign Application Priority Data

May 30, 2014 (KR) .................... 10-2014-0066255
Jun. 23, 2014 (KR) .................... 10-2014-0076455

(51) Int. Cl.
*H04M 1/00* (2006.01)
*G06F 3/041* (2006.01)
(Continued)

(52) U.S. Cl.
CPC ............ *G06F 3/0416* (2013.01); *G06F 1/163* (2013.01); *G06F 3/04817* (2013.01);
(Continued)

(58) Field of Classification Search
CPC ... H04W 4/008; H04W 76/023; H04W 12/06; H04W 4/02; H04W 52/0209;
(Continued)

(56) References Cited

U.S. PATENT DOCUMENTS 6,476,797 B1  11/2002  Kurihara et al.
9,426,275 B2   8/2016  Eim et al.
2014/0125629 A1 5/2014 Panther et al.

FOREIGN PATENT DOCUMENTS

CN    103649899   3/2014
WO    2013/009092  1/2013

OTHER PUBLICATIONS

Samsung, "Samsung Galaxy Gear Mobile Device User Manual," XP055215389, Jan. 2013, 84 pages.
(Continued)

*Primary Examiner* — Ronald Eisner
(74) *Attorney, Agent, or Firm* — Lee Hong Degerman Kang & Waimey

(57) ABSTRACT

A mobile terminal and controlling method thereof are disclosed, by which various convenient functions including application management in association with such a wearable external device as a watch type mobile terminal and the like can be provided. The present invention includes a wireless communication unit, a touchscreen, and a controller, when the touchscreen is turned off, if a $1^{st}$ touch is inputted to the touchscreen and a $2^{nd}$ touch is then inputted to the touchscreen by maintaining the $1^{st}$ touch, turning on the touchscreen and controlling information of at least one wearable device currently connected through the wireless communication unit to be displayed on the touchscreen.

20 Claims, 42 Drawing Sheets

(51) Int. Cl.
*H04M 1/725* (2006.01)
*H04W 4/00* (2018.01)
*H04W 4/20* (2018.01)
*G06F 1/16* (2006.01)
*G06F 3/0488* (2013.01)
*G06F 3/0481* (2013.01)
*G06F 3/0484* (2013.01)
*H04W 88/02* (2009.01)

(52) U.S. Cl.
CPC ...... *G06F 3/04842* (2013.01); *G06F 3/04883* (2013.01); *H04M 1/72533* (2013.01); *H04W 4/008* (2013.01); *H04W 4/20* (2013.01); *G06F 2203/04104* (2013.01); *H04M 2250/10* (2013.01); *H04W 88/02* (2013.01)

(58) Field of Classification Search
CPC . H04W 8/005; H04W 48/16; H04W 52/0219; H04W 76/02; H04W 84/18; H04W 88/02; H04W 8/26
See application file for complete search history.

(56) References Cited

OTHER PUBLICATIONS

Dualcomm, "Getting Started: Qualcomm Toq—Smartwatch—User Manual," XP055198228, Nov. 2013, 38 pages.
European Patent Office Application No. 15150773.8, Search Report dated Oct. 20, 2015, 8 pages.
State Intellectual Property Office of the People's Republic of China Application Serial No. 201510280211.X, Office Action dated Sep. 29, 2017, 25 pages.
Samsung, "Samsung Galaxy Gear Mobile Device User Manual", Samsung Telecommunications America (STA) LLC, Oct. 2013, 83 pages.
European Patent Office Application Serial No. 15150773.8, Office Action dated Jun. 22, 2017, 7 pages.

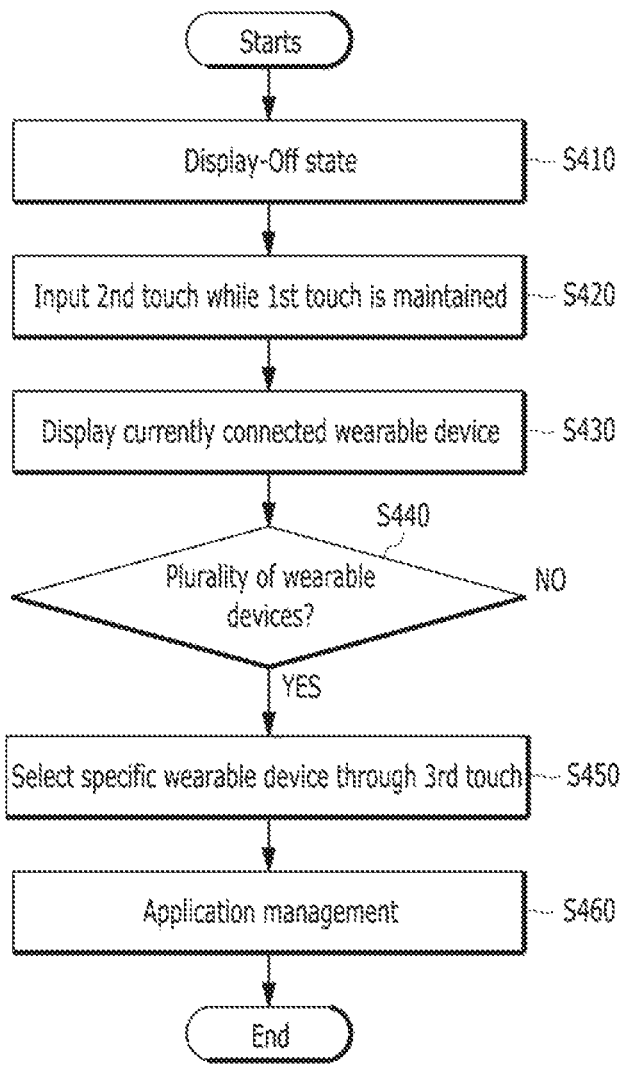

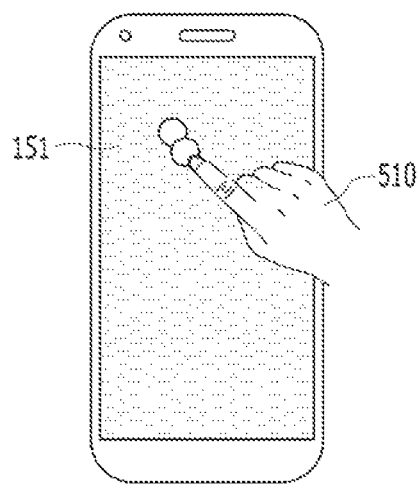
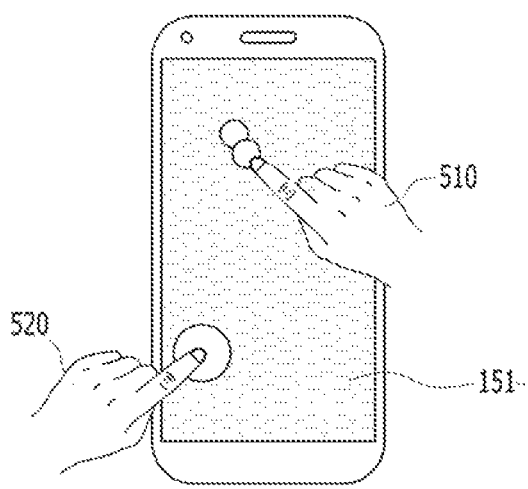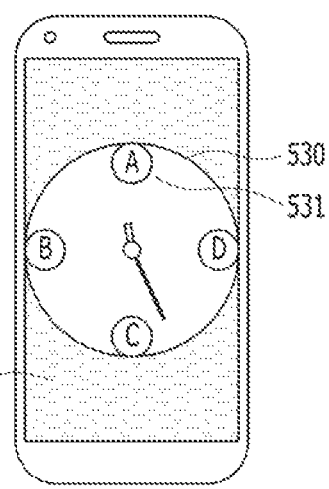

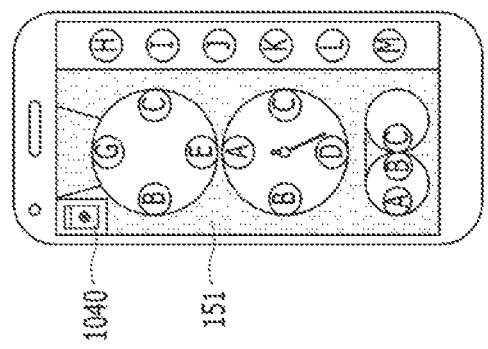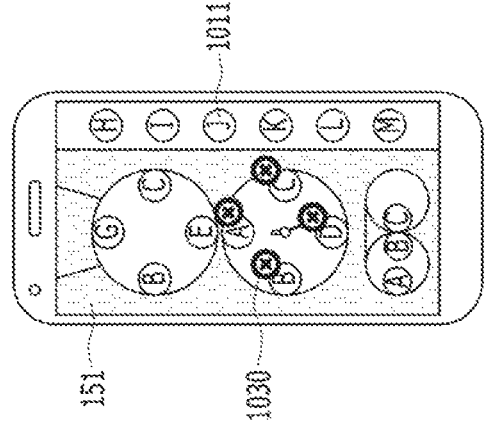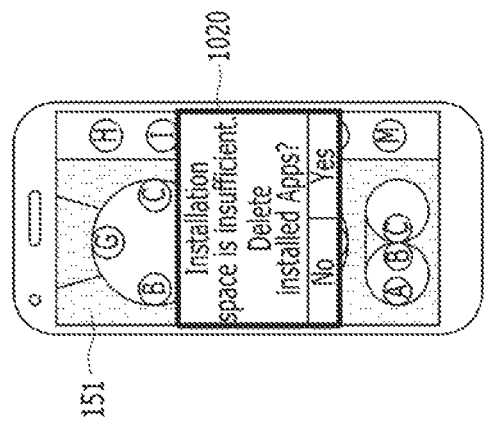

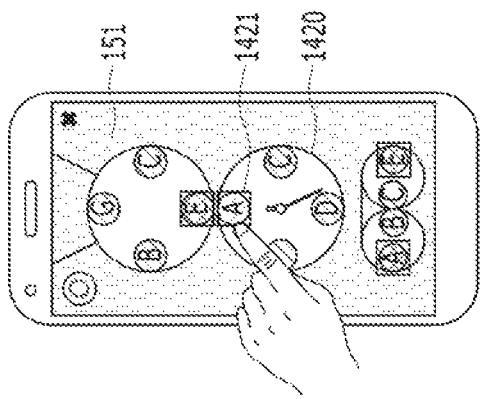
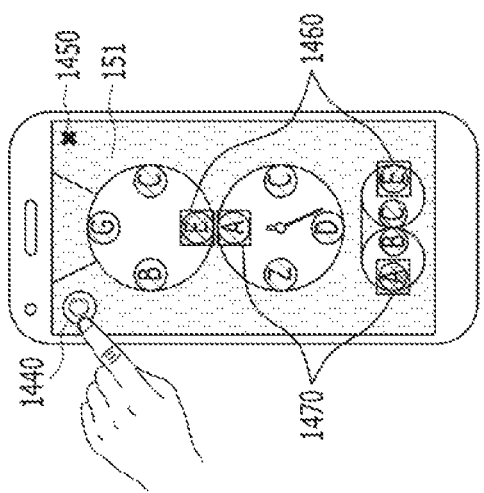
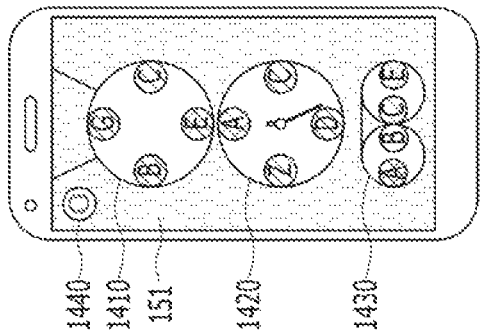

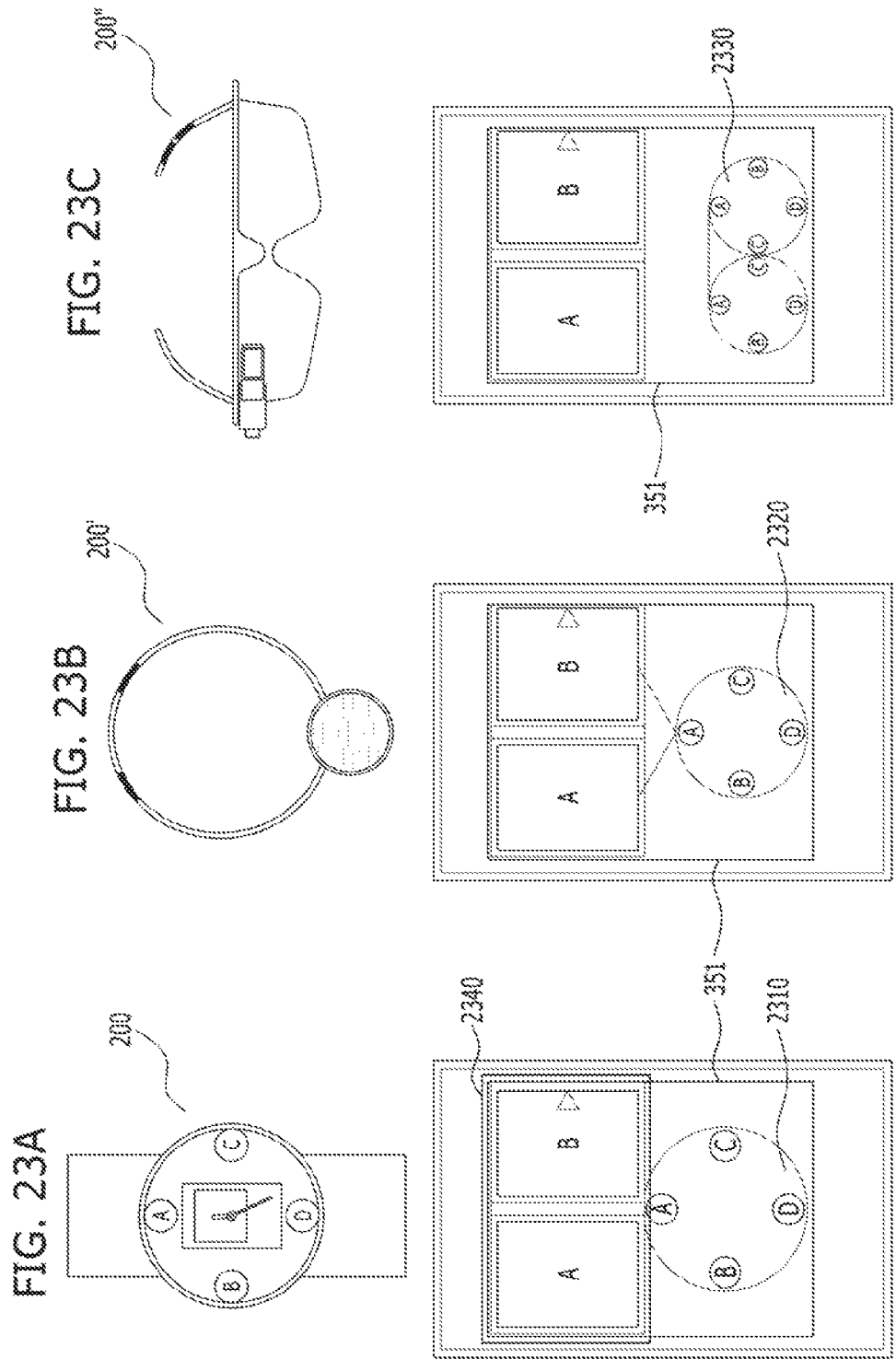

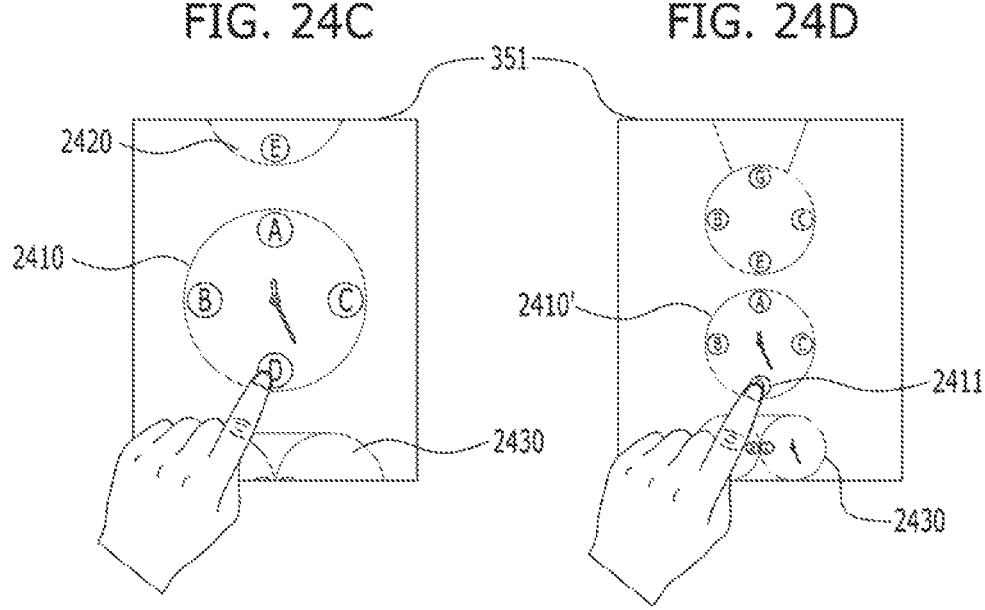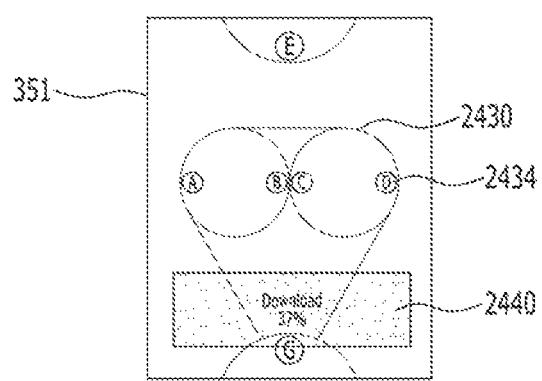

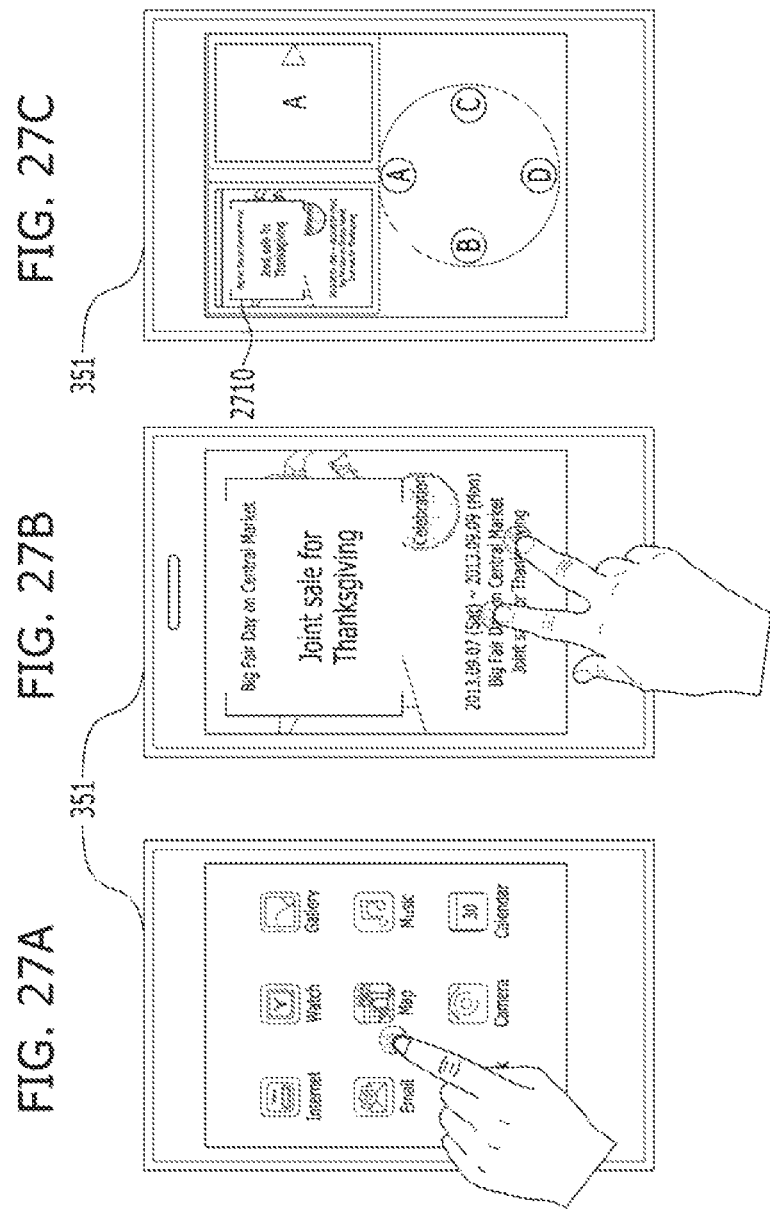

MOBILE TERMINAL AND CONTROLLING METHOD FOR DISPLAYING INFORMATION OF A WEARABLE DEVICE

CROSS-REFERENCE TO RELATED APPLICATIONS

This application is a continuation of U.S. patent application Ser. No. 14/614,130, filed on Feb. 4, 2015, now U.S. Pat. No. 9,426,275, which claims the benefit of earlier filing date and right of priority to Korean Application Nos. 10-2014-0066255, filed on May 30, 2014, and 10-2014-0076455, filed on Jun. 23, 2014, the contents of which are all hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for providing various convenient functions including application management in association with such a wearable external device as a watch type mobile terminal and the like.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, such a mobile terminal as a smartphone and the like tends to be linked to various kinds of wearable devices. A mobile terminal of a watch type can be taken as one example of a wearable device. However, the watch type mobile terminal just plays a role as a relay of an input/output means for performing a prescribed function of a mobile terminal in part. Moreover, in order to install an application on a wearable device or to synchronize application data with a mobile terminal, it is inconvenient for the mobile terminal to run a separate application for managing the wearable device.

Meanwhile, such display devices as digital advertising panels tend to be increasingly installed. Yet, since such a display device shows a preset image or information corresponding to a touch input only, the demand for the display device to interwork with such a mobile terminal as a wearable device and the like is rising.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which convenient functions can be provided in a manner of being connected to a wearable device.

Particularly, the object of the present invention is to provide a mobile terminal and controlling method thereof, by which an application of a wearable device can be managed in the mobile terminal more conveniently.

Another object of the present invention is to provide a mobile terminal and controlling method thereof, by which an event occurring in a wearable device can be conveniently processed in the mobile terminal.

Further object of the present invention is to provide a display device and controlling method thereof, by which information of a mobile terminal can be managed more conveniently.

Another further object of the present invention is to provide a mobile terminal and controlling method thereof, by which information displayed on a display device can be shared.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a wireless communication unit, a touchscreen, and a controller, when the touchscreen is turned off, if a $1^{st}$ touch is inputted to the touchscreen and a $2^{nd}$ touch is then inputted to the touchscreen by maintaining the $1^{st}$ touch, turning on the touchscreen and controlling information of at least one wearable device currently connected through the wireless communication unit to be displayed on the touchscreen.

In another aspect of the present invention, as embodied and broadly described herein, a method of controlling a mobile terminal includes the steps of when a touchscreen is turned off, inputting a $1^{st}$ touch to the touchscreen, if a $2^{nd}$ touch is inputted to the touchscreen by maintaining the $1^{st}$ touch, turning on the touchscreen, and displaying information of at least one wearable device currently connected to the mobile terminal on the touchscreen.

In further aspect of the present invention, as embodied and broadly described herein, a display device according to another embodiment of the present invention includes a wireless communication unit, a touchscreen, and a controller, if a $1^{st}$ touch is inputted to the touchscreen and a $2^{nd}$ touch is then inputted by maintaining the $1^{st}$ touch, controlling information of at least one wearable device currently connected through the wireless communication unit to be displayed on the touchscreen.

In another further aspect of the present invention, as embodied and broadly described herein, a method of controlling a display device according to another embodiment of the present invention includes the steps of connecting the display device to at least one wearable device through a wireless communication unit, inputting a $1^{st}$ touch to a touchscreen, and if a $2^{nd}$ touch is inputted by maintaining the $1^{st}$ touch, displaying information of at least one wearable device currently connected the display device through the wireless communication unit on the touchscreen.

Accordingly, the present invention provides the following effects and/or advantages.

First of all, a mobile terminal is set to interwork with a wearable device, thereby providing various kinds of convenient functions.

Secondly, the present invention enables a convenient and intuitive access to an environment capable of managing applications of a wearable device in various situations.

Thirdly, according to the present invention, an event occurring in a wearable device is associatively processed in a mobile terminal through a situation recognition and gesture and informations acquired from a plurality of wearable devices can be managed in an integrated way through the mobile terminal.

Fourthly, according to the present invention, information of a mobile terminal connected to a display device can be managed by the display device.

Fifthly, according to the present invention, information displayed on a display device is conveniently shared with a mobile terminal or can be delivered to other terminals.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flowchart for one example of a process for a mobile terminal to manage an application of a wearable device by entering an application management mode according to one embodiment of the present invention;

FIGS. 5A to 5C are diagrams for one example of inputting a $1^{st}$ touch and a $2^{nd}$ touch in a mobile terminal according to one embodiment of the present invention;

FIGS. 10A to 10G are diagrams for examples of installing an application installed on a mobile terminal on a wearable device connected to the mobile terminal according to one embodiment of the present invention;

FIGS. 14A to 14C are diagrams for one example of a method of performing synchronization of applications installed on a connected wearable device in a mobile terminal according to one embodiment of the present invention;

FIGS. 23A to 23C are diagrams for one example of a configuration that information of a wearable device is displayed on an external display device in accordance with a type of the wearable device according to another embodiment of the present invention;

FIGS. 24C to 24E is a diagram for one example of a process for installing an application on a prescribed wearable device selected from a plurality of wearable devices connected to an external display device according to another embodiment of the present invention;

FIGS. 27A to 27C are diagrams for one example of a process for updating use history of a wearable device through an external display device according to another embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
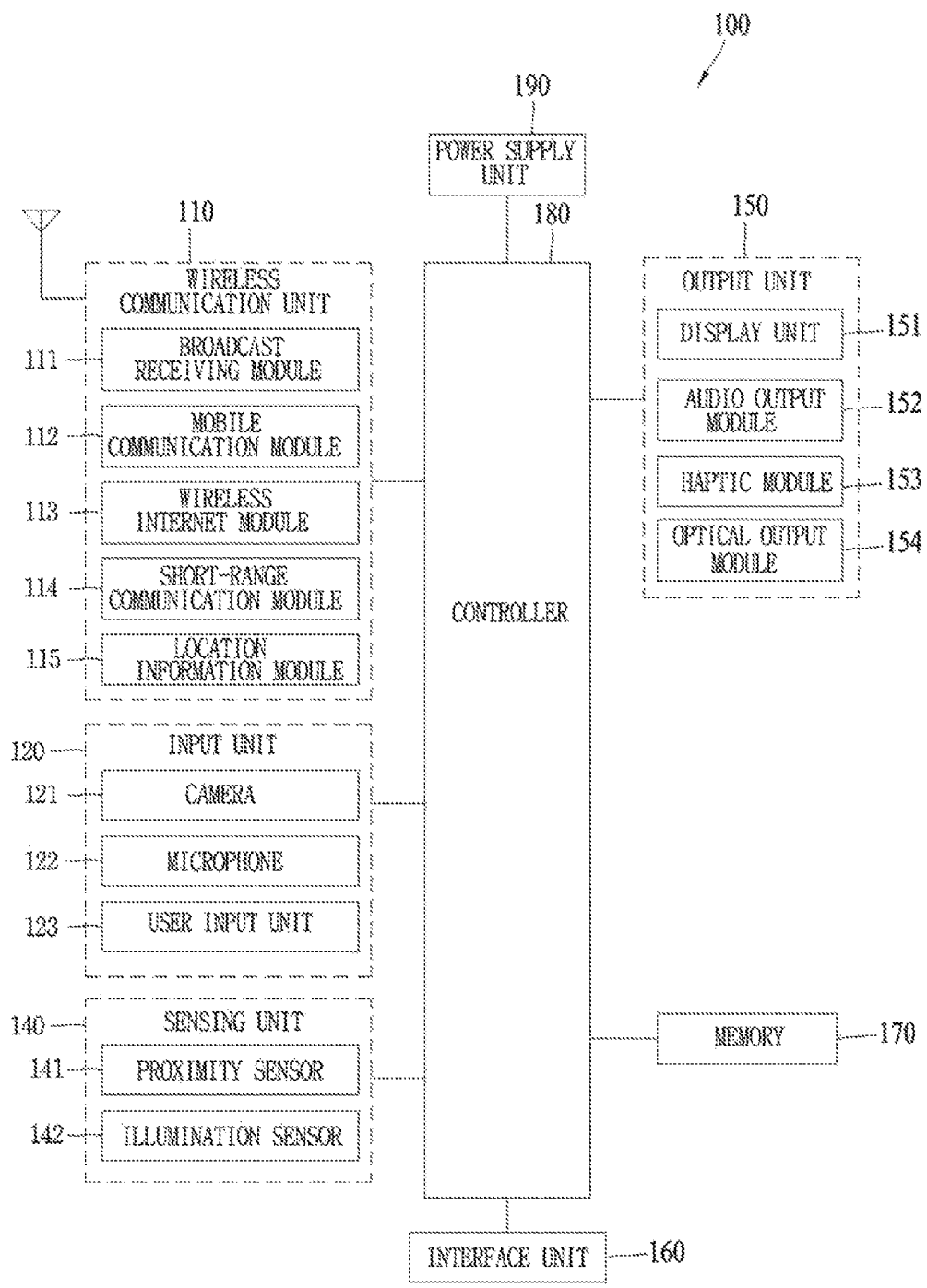
FIG. 1 is a block diagram of a mobile terminal according to one embodiment of the present invention.
Figure 2A:
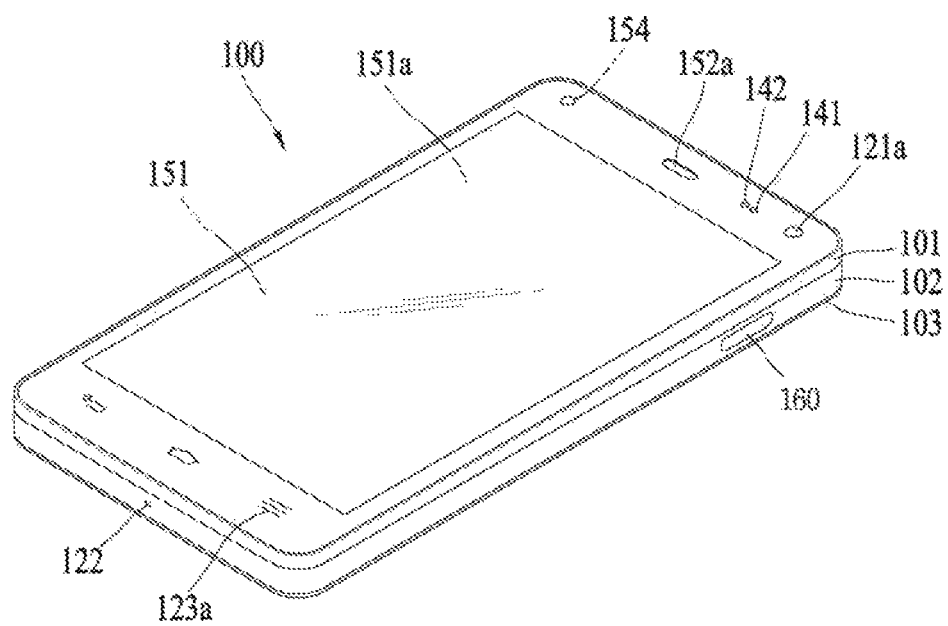
FIG. 2A and FIG. 2B are perspective diagrams of a mobile terminal according to one embodiment of the present invention in different views.
Figure 2B:
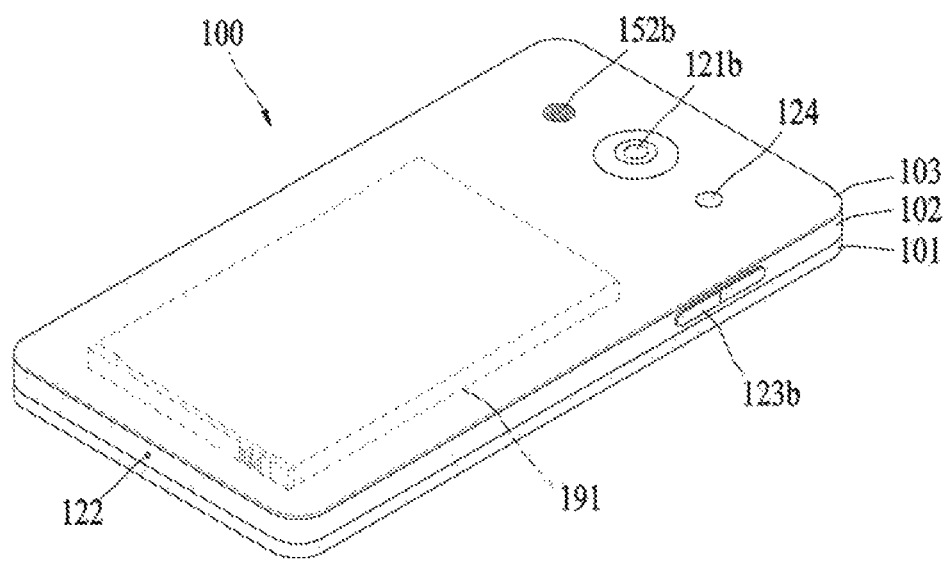

Reference is now made to FIGS. 1-2B, where FIG. 1 is a block diagram of a mobile terminal in accordance with the present disclosure, and FIGS. 2A and 2B are conceptual views of one example of the mobile terminal, viewed from different directions.

According to the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1-2B according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2A illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2B, a flash 124 is shown adjacent to the second camera 121b. When an image of a subject is captured with the camera 121b, the flash 124 may illuminate the subject.

As shown in FIG. 2A, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 3:
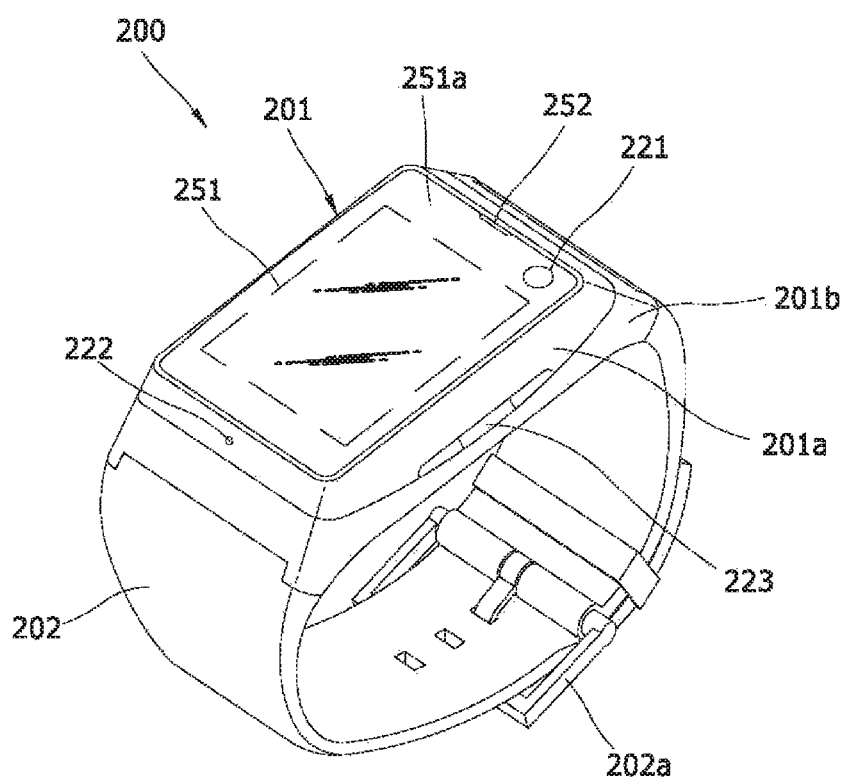
FIG. 3 is a perspective diagram of a watch type wearable device 200 according to another embodiment of the present invention.

FIG. 3 is a perspective view illustrating a watch-type mobile terminal 200 as one example a wearable device in accordance with embodiments of the present invention. As illustrated in FIG. 3, the watch-type mobile terminal 200 includes a main body 201 with a display unit 251 and a band 202 connected to the main body 201 to be wearable on a wrist.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body. In this case, various electrical/electronic parts included in the case can be configured to perform at least the same or similar functions of the respective components described with reference to FIGS. 1-2B. For instance, a controller is provided to a watch type mobile terminal. And, a wireless communication unit, an interface unit, a memory and the like can be further provided to the watch type mobile terminal if necessary.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Moreover, it is a matter of course that a wearable device of a watch type is provided with a controller configured to control the respective components configuring the wearable device and to perform decision and processing on each function mentioned in the following description [not shown in the drawing]. Besides, the present invention is applicable to wearable devices of various types including a bracelet type, a glasses type, a necklace type and the like as well as to a wearable device of a watch type. In this case, configurations of the components shown in FIG. 3 can be modified to fit wearable shapes.

Assume that the mobile terminal 100 according to the present invention includes at least one of the components shown in FIGS. 1 to 2B. In particular, the mobile terminal 100 according to the present invention can be assumed as including the wireless communication unit 110, the sensing unit 140, the display unit 151 and the controller 180.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Moreover, a mobile terminal can perform a data exchange for performing a linked function, which will be described later, by being connected to a wearable device through a short range communication (e.g., Bluetooth, etc.), a wireless internet, and the like. Each function mentioned in the following description can be executed through at least one application. In particular, at least two applications can run together to execute a single function or the corresponding function can be executed through a single application.

Application Management of Wearable Device Through Mobile Terminal

According to one embodiment of the present invention, a mobile terminal and controlling method thereof are provided to facilitate management of an application of a connected wearable device. Particularly, the present embodiment proposes a method as follows. First of all, a separate application is run in order for a mobile terminal to manage an application of a wearable device for installation, information synchronization and the like. Secondly, a management job can be entered conveniently and easily to avoid inconvenience in doing the management job through the running application. In particular, the present embodiment proposes to enter a manageable mode (hereinafter called 'application management mode) of an application of a connected wearable device through a touch input of a specific type while a display of a mobile terminal is turned off.

The above description is explained in detail with reference to FIG. 4 as follows.

FIG. 4 is a flowchart for one example of a process for a mobile terminal to manage an application of a wearable device by entering an application management mode according to one embodiment of the present invention.

In FIG. 4, assume a state that at least one wearable device is already connected to a mobile terminal. In particular, assume a case of completing a data path establishment after finishing a prescribed initial registration procedure. Of course, a case that a wearable device enters a standby/power saving mode (e.g., idle/sleep mode, etc.) for entering a data exchangeable state through a relatively simple procedure can be included in a 'connecting' state mentioned in the present invention as well as a case that a data exchange is possible right after an establishment of a data path.

Referring to FIG. 4, a display of the touchscreen 151 of the mobile terminal may be turned off [S410]. When the touchscreen 151 includes a touch sensor and a display, this may mean a state that an input of a touch with a pointer can be detected owing to an activated touch sensor despite that no images are displayed on a display. While the display is turned on due to one of various reasons (e.g., an alarm/communication event occurrence, a user's key button manipulation, etc.), if a power key button is manipulated, the controller can control the display to be turned off. After the display has been turned off, if there is no event occurrence or key button manipulation for prescribed duration, the controller can control the display to be turned off as well.

After the display has been turned off, while a $1^{st}$ touch to the touchscreen is maintained instead of being cancelled, if a $2^{nd}$ touch is inputted [S420], the controller 180 turns on the display and is also able to control at least one currently connected wearable device to be displayed in a prescribed form [S430]. In doing so, the $1^{st}$ touch can be inputted to a random point on the touchscreen and the $2^{nd}$ touch in a predetermined pattern is preferably inputted to a point different from the $1^{st}$ touch inputted. In this case, the predetermined pattern of the $2^{nd}$ touch may be equal to or different from a pattern for turning on the touchscreen or cancelling a lock screen. If the predetermined pattern of the $2^{nd}$ touch is different from the pattern for turning on the touchscreen or cancelling the lock screen, it may be able to consider omitting the $1^{st}$ touch. The currently connected wearable device can be displayed as a list. The currently connected wearable device can be displayed in a manner that a visual effect is given to the corresponding wearable device to correspond to a shape of the wearable device. And, the currently connected wearable device can be displayed together with an application installed on the corresponding wearable device or a function executable through the installed application. Details of the wearable device shall be described later.

If a plurality of wearable devices are currently connected [S440], a prescribed wearable device desired for application management by a user can be selected from a plurality of the currently connected wearable devices through a $3^{rd}$ touch input [S450]. In case that a single wearable device is currently connected, application management can be executed in direct [S460]. In this case, the application management can include a process for installing an application, which is installed on a mobile terminal, on a currently connected wearable device, a process for installing an application, which is installed on a currently connected wearable device, on a mobile terminal, and a process for installing an application, which is installed on one wearable device, on another wearable device. In case that the same application is installed on at least two wearable devices currently connected to a mobile terminal, synchronization of application data can be included in the application management of the present embodiment.

Generally, when a display is turned off, a connected wearable device can be checked or application management can be performed in a manner of turning on the display and then running a wearable device management application in a home screen or an application list. Yet, in case that the display is turned off, it is able to check a currently connected wearable device through a touch input in a preset pattern only by the aforementioned steps S410 to S430.

The application managing method described with reference to FIG. 4 is described in detail with reference to FIGS. 5A to 5C as follows. In the following descriptions, 'a touchscreen is turned off' means a state that a touch sensing function is working despite that a display function of the touchscreen is turned off.

FIGS. 5A to 5C are diagrams for one example of inputting a $1^{st}$ touch and a $2^{nd}$ touch in a mobile terminal according to one embodiment of the present invention.

As mentioned in the foregoing description, a predetermined pattern of a $2^{nd}$ touch may be equal to or different from a pattern for turning on a touchscreen or cancelling a lock screen. And, the equal case is described with reference to FIGS. 5A to 5C. Moreover, assume a case that a watch type wearable device is connected to a mobile terminal.

For instance, referring to FIG. 5A, while the touchscreen 151 is turned off, if the touchscreen 151 is knocked twice consecutively within a prescribed time using a pointer 510, the touchscreen 151 can be turned on. Such a method of turning on a touchscreen shall be named 'knock on' for clarity. On the other hand, while a touch contact (i.e., $1^{st}$ touch) with the touchscreen 151 is maintained using one pointer 520, if the touchscreen 151 is touched twice consecutively using another pointer 510 [i.e., $2^{nd}$ touch] [FIG. 5B], the touchscreen 151 is turned on and information of a connected watch type wearable device can be displayed in a watch shape 530 [FIG. 5C]. Within the watch shape, the hands of a watch corresponding to a current time can be displayed. And, a plurality of icons/indicators 531 can be displayed on dial edge of a watch. Each of the icons or indicators may correspond to a single application installed on the wearable device or an application group including a plurality of applications and may indicate an operating status of the wearable device. Regarding the number of the icons/indicators, a preset number may be displayed only in order of recent use or in accordance with a user-set priority. And, other icons/indicators may be displayed through a scroll. In the present specification, an icon/indicator is uniformly configured in a manner of displaying an alphabet in a circle. If an alphabet is different, a type of the icon/indicator is assumed as different. If an alphabet is identical, a type of the icon/indicator is assumed as the same. This assumption is made for clarity of the description. And, it is apparent to those skilled in the art that the present invention is non-limited by a configuration and deployment location of an icon/indicator. If information of a connected wearable device displayed through a $1^{st}$ or $2^{nd}$ touch is displayed to correspond to a shape of the corresponding device, it is displayed for facilitation of visual device discrimination. Hence, it is unnecessary for the information to be displayed to correspond to the corresponding shape. Meanwhile, if a specific icon is selected, detailed information (e.g., size, source, authority, running status, saved location, etc.) of an application or operation status corresponding to the selected icon can be displayed [not shown in the drawing].

Figure 6A:
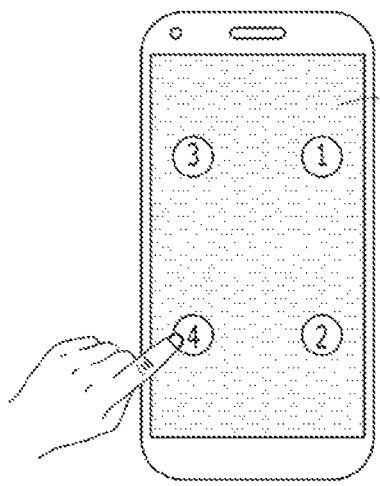
FIGS. 6A to 6C are diagrams for another example of inputting a $1^{st}$ touch and a $2^{nd}$ touch in a mobile terminal according to one embodiment of the present invention.
Figure 6B:
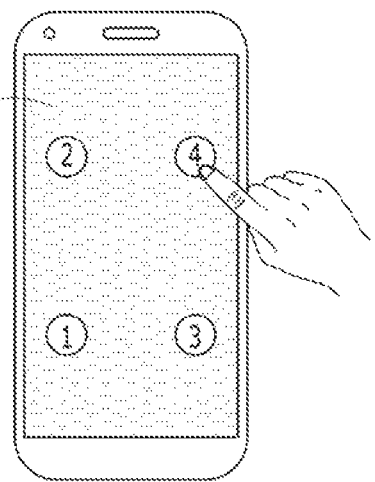
Figure 6C:
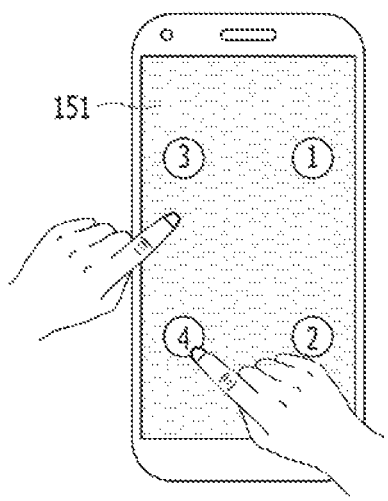

FIGS. 6A to 6C are diagrams for another example of inputting a $1^{st}$ touch and a $2^{nd}$ touch in a mobile terminal according to one embodiment of the present invention.

As mentioned in the foregoing description, a predetermined pattern of a $2^{nd}$ touch may be equal to or different from a pattern for turning on a touchscreen or cancelling a lock screen. And, the different case is described with reference to FIG. 6.

Referring to FIG. 6A, while a touchscreen 151 is turned off, if 4 points are touched in a predetermined sequence (e.g., 1 to 4), a lock screen is unlocked as soon as the touchscreen 151 is turned on. In this case, the 4 points marked with numerals are provided to help the understanding of this example but are not actually displayed on the touchscreen. And, it is a matter of course that the sequence, locations and number of the points can be changed.

On the other hand, a pattern for displaying a currently connected wearable device can be configured different from that of a touch sequence and points for turning on a touchscreen. For instance, while a touchscreen is turned off, if touch inputs to 4 points in order of the numeral sequence is detected [FIG. 6B], the controller can display information of a currently connected wearable device in a manner similar to that shown in FIG. 5 (c).

Of course, referring to FIG. 6C, while a touched state (i.e., $1^{st}$ touch) of a random point on a touchscreen is maintained if a touch (i.e., $2^{nd}$ touch) is inputted in the same pattern shown in FIG. 6A, information of a wearable device can be displayed.

Figure 7A:
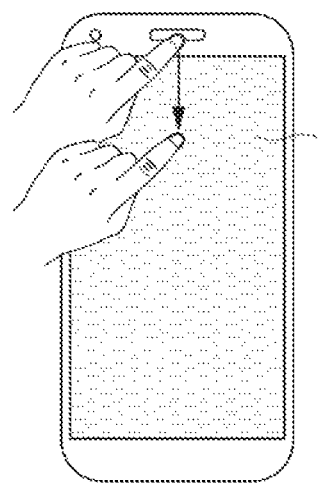
FIGS. 7A and 7B are diagrams for one example of a method of inputting a command for displaying an information of a connected wearable device on a mobile terminal according to one embodiment of the present invention.
Figure 7B:
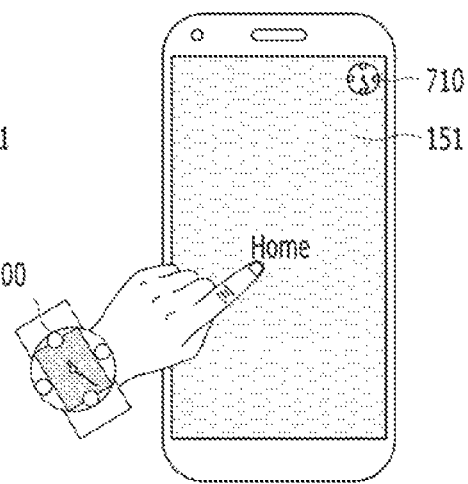

FIGS. 7A and 7B are diagrams for one example of a method of inputting a command for displaying an information of a connected wearable device on a mobile terminal according to one embodiment of the present invention.

Referring to FIG. 7A, without discriminating a $1^{st}$ touch and a $2^{nd}$ touch from each other, while the touchscreen 151 is turned off, if a touch input applied in a manner of being dragged from a touchscreen top end to a touchscreen bottom end is detected, the controller 180 turns on the touchscreen 151 and is able to control information of a currently connected wearable device to be displayed through the touchscreen 151. Of course, such a drag touch input can start from a case edge (i.e., bezel) of the touchscreen top end.

On the other hand, referring to FIG. 7B, while a user wears a wearable device 200, if the touchscreen 151 is turned on, the controller 180 determines whether the user wears the wearable device. If the controller 180 determines that the user currently wears the wearable device, the controller 180 can control an icon 710, which corresponds to the wearable device, to be displayed on a screen (e.g., a home screen, etc.) during a prescribed time. If the icon 710 is selected through a touch input before disappearing, the controller 180 can control an information of a currently connected wearable device to be displayed. Of course, while the corresponding icon 710 is displayed, if specific hardware key button(s) is manipulated, the controller 180 can control an information of a currently connected wearable device to be displayed. Moreover, after the touchscreen has been turned on, only if a specific screen (e.g., a home screen) is displayed, the icon 710 can be displayed. Alternatively, the icon may be displayed irrespective of contents displayed on the touchscreen that is turned on.

A display configuration depending on a type of a wearable device is described in detail with reference to FIGS. 8A to 8C as follows.

Figure 8C:
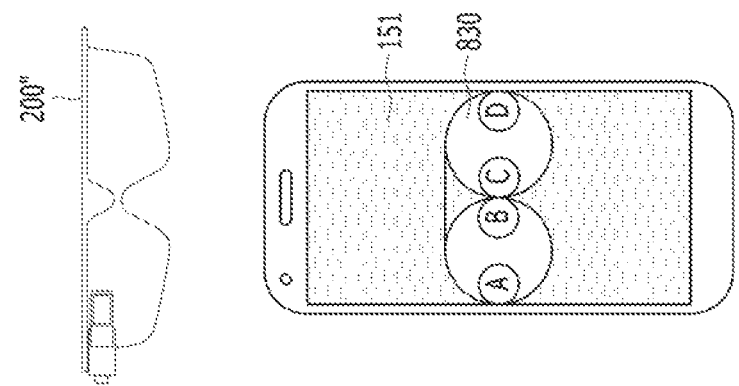
FIGS. 8A to 8C are diagrams for one example of a configuration of displaying an information of a wearable device in accordance with a type of the wearable device on a mobile terminal according to one embodiment of the present invention.
Figure 8B:
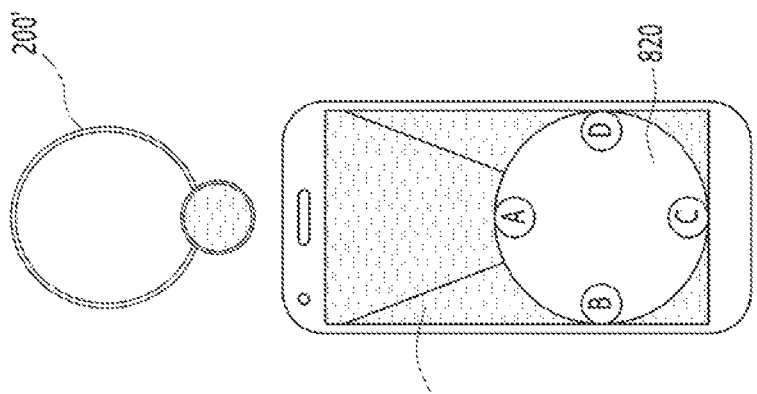
Figure 8A:
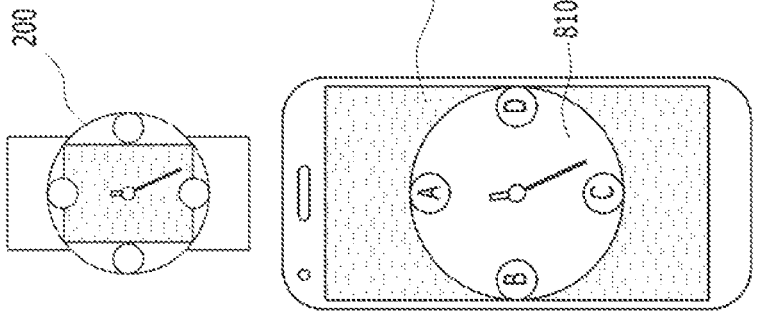

FIGS. 8A to 8C are diagrams for one example of a configuration of displaying an information of a wearable device in accordance with a type of the wearable device on a mobile terminal according to one embodiment of the present invention.

In FIGS. 8A to 8C, assume that a command for displaying information of a connected wearable device has been inputted by one of the former methods described with reference to FIGS. 5A to 7B.

Referring to FIG. 8A, in case that a wearable device is a watch type 200, information of the wearable device can be displayed within silhouette of a watch shape 810.

Referring to FIG. 8B, in case that a wearable device is a necklace type 200', information of the wearable device can be displayed within silhouette of a necklace shape 820.

Referring to FIG. 8C, in case that a wearable device is a glasses type 200", information of the wearable device can be displayed within silhouette of a glasses shape 830.

In the following description, when a plurality of wearable devices are currently connected to a mobile terminal, a display configuration and a selecting method are explained with reference to FIGS. 9A to 9E.

Figure 9A:
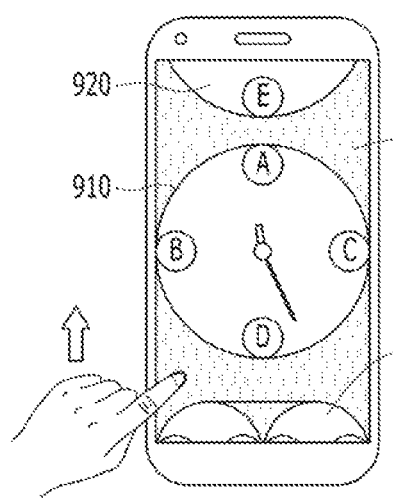
FIGS. 9A to 9B are diagrams for one example of a configuration of displaying an information of a wearable device on a mobile terminal connected to a plurality of wearable devices according to one embodiment of the present invention.
Figure 9B:
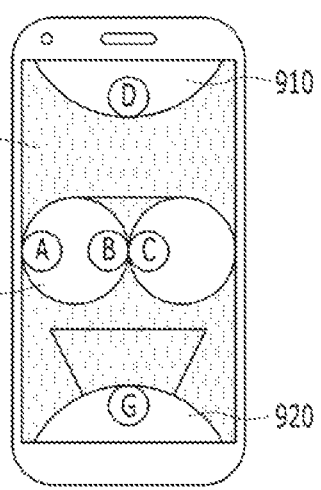

FIGS. 9A and 9B are diagrams for one example of a configuration of displaying an information of a wearable device on a mobile terminal connected to a plurality of wearable devices according to one embodiment of the present invention.

In FIG. 9A, while a wearable device of a watch type, a wearable device of a necklace type and a wearable device of a glasses type are connected to a mobile terminal, assume that a command for displaying information of the wearable device is inputted.

Referring to FIG. 9A, an information 910 of the watch type wearable device is displayed in the middle part of the touchscreen 151. An information 920 of the necklace type wearable device is displayed above the information 910 of the watch type wearable device. And, an information 930 of the glasses type wearable device is displayed below the information 910 of the watch type wearable device. In this case, the order of arrangement of the devices can be determined in a manner that a previously/last used/connected device is arranged in the middle. In particular, FIG. 9A shows a case that the watch type wearable device is connected or used last. Alternatively, the order of arrangement of the wearable devices may follow the order preset by a user. Alternatively, a currently put-on wearable device can be displayed in the middle of the touchscreen 151.

In doing so, if a user inputs a drag or flicking touch in an arrow direction (e.g., top direction) with a pointer, referring to FIG. 9B, a rotation occurs in the top direction so that the glasses type wearable device 930 can be displayed in the middle.

Figure 9C:
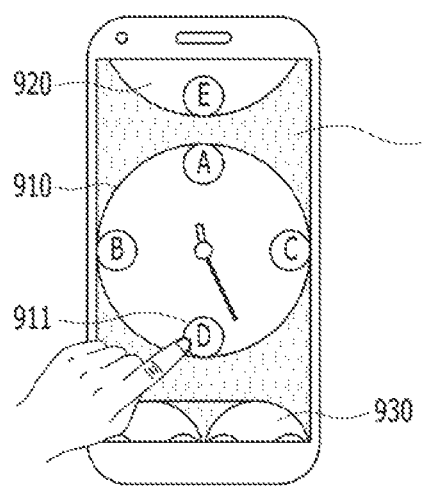
FIGS. 9C to 9E are diagrams for one example of a process for installing an application by selecting a prescribed wearable device from a plurality of wearable devices connected to a mobile terminal according to one embodiment of the present invention.
Figure 9D:
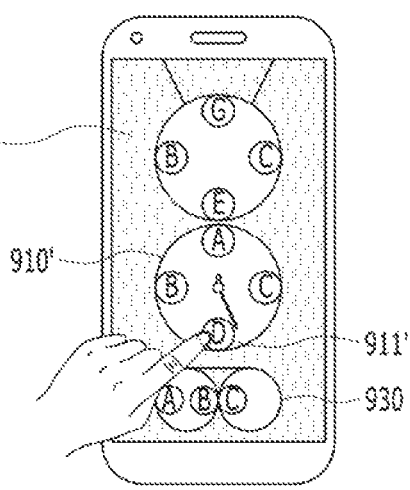
Figure 9E:
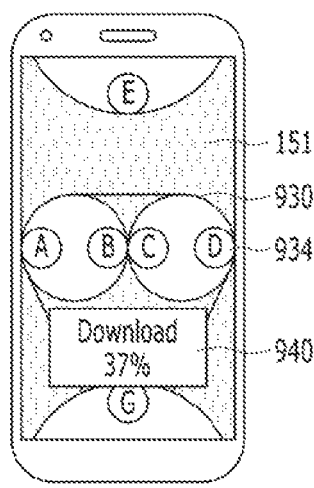

FIGS. 9C to 9E are diagrams for one example of a process for installing an application by selecting a prescribed wearable device from a plurality of wearable devices connected to a mobile terminal according to one embodiment of the present invention.

Referring to FIG. 9C, in the former situation shown in FIG. 9A, if an icon 911 corresponding to a specific application is selected from information of a watch type wearable device through a touch input (e.g., a long touch) of a preset type [FIG. 9C], all wearable devices can be displayed on a single screen by zooming out from a screen [FIG. 9D]. In doing so, the corresponding icon enters a movable state 911' to correspond to a point of a touch with a pointer. If the corresponding icon is dragged to a region for displaying an information 930 of a glasses type wearable device and then released from the touch, an application corresponding to the icon can start to be installed on the glasses type wearable device. Hence, referring to FIG. 9E, an icon 934 corresponding to the application is created from the region for displaying the information 930 of the glasses type wearable device and an installation progress state 940 can be displayed.

In doing so, in order to install an application, an application installation file is extracted from a device having the corresponding application installed thereon and then forwarded to a target device. Alternatively, an installable address (e.g., URL) or an identification information of an application providing service can be forwarded to the target device only. Of course, if a direct inter-wearable device communication is not supported, the mobile terminal 100 can relay the corresponding information.

In the following description, a process for installing an application, which is already installed on a mobile terminal, on a wearable device is described in detail with reference to FIG. 10A and FIG. 10B.

FIG. 10A to 10G are diagrams for examples of installing an application installed on a mobile terminal on a wearable device connected to the mobile terminal according to one embodiment of the present invention.

Figure 10A:
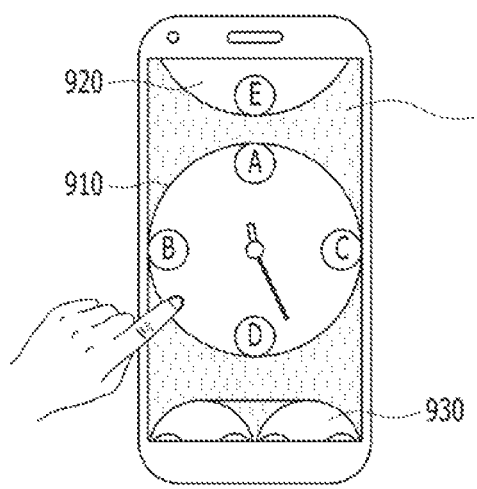
Figure 10B:
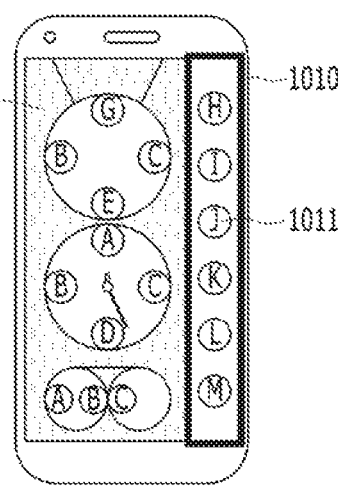

Referring to FIG. 10A, in the former situation shown in FIG. 9A, if a region having no icons displayed thereon is selected from a region for displaying an information 910 of a watch type wearable device through a touch input (e.g., a long touch) of a preset type [FIG. 10A], all wearable devices can be displayed on a single screen by zooming out from a screen [FIG. 10B]. In doing so, icons corresponding to applications installable on a wearable device among all the applications installed on the mobile terminal can be displayed on a right region 1010 of a screen. In this case, the right region 1010 can be scrolled in top-bottom and/or right-left direction so as to display other icons failing to be displayed thereon. In this case, if a user intends to install a specific application on the watch type wearable device, the user can drag an icon 1011 corresponding to the specific application to the region for displaying the information 910 of the watch type wearable device.

Figure 10C:
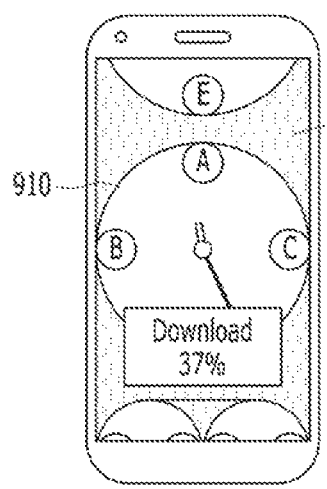
Figure 10D:
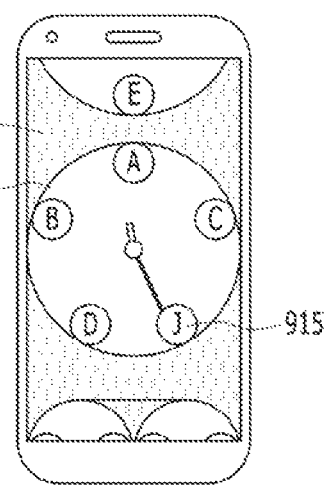

Hence, an installation progress diagram can be displayed as soon as the installation starts [FIG. 10C]. If the installation is complete, an icon 915 corresponding to the installed application can be added to the region for displaying the information 910 of the watch type wearable device [FIG. 10D].

If the wearable device is short of storage space, a popup window 1020 indicating the shortage can be displayed [FIG. 10E]. If a user selects 'delete', a delete indicator 1030 can be displayed adjacent to each icon in the region for displaying the information of the watch type wearable device [FIG. 10F]. An application corresponding to the icon having its delete indicator selected can be removed from the corresponding device. Alternatively, a trash icon 1040 can be displayed instead of the delete indicator [FIG. 10G]. Moreover, a user can delete an application in a manner of dragging an icon corresponding to a deletion-desired application to the trash icon 1040.

Meanwhile, there may exist an application that cannot be installed in accordance with a configuration of settings of a wearable device. A method of indicating that an application is not installable is described in detail with reference to FIG. 11 as follows.

Figure 11A:
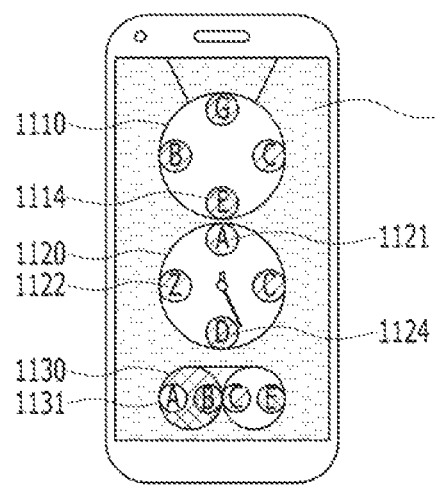
FIGS. 11A and 11B are diagrams for one example of a method of displaying possibility in installing an application per wearable device in a mobile terminal according to one embodiment of the present invention.
Figure 11B:
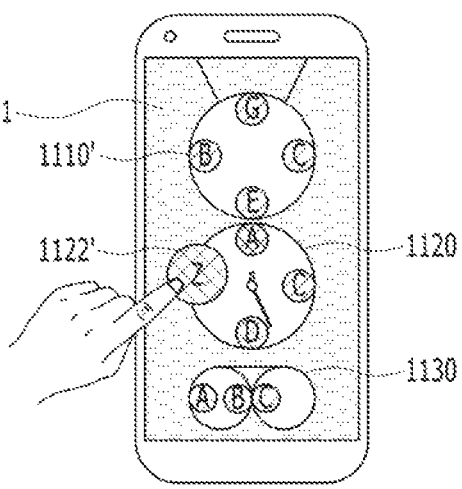

FIGS. 11A and 11B are diagrams for one example of a method of displaying possibility in installing an application per wearable device in a mobile terminal according to one embodiment of the present invention.

Referring to FIG. 11A, different visual effects can be given to icons corresponding to applications installable on another wearable device and icons corresponding to applications not installable on another wearable device, respectively. In the example shown in FIG. 11A, an application E 1114 in an information 1110 of a necklace type wearable device is installable on another device only. Application A 1121, application Z 1122 and application D 1124 in an information 1120 of a watch type wearable device are installable on another device only. And, an application A 1131 in an information 130 of a glasses type wearable device is installable on another device only. Besides, in the zoom-out state shown in FIG. 10B, whether an application of a mobile terminal is installable on another device can be displayed on a prescribed region in accordance with settings [not shown in the drawing].

If an icon 1122 corresponding to a specific application is selected from the information 1120 of the watch type wearable device by a long touch or the like, referring to FIG. 11B, a movable state 1122' can be entered. In doing so, if the application corresponding to the selected icon is not installable on the necklace type wearable device, a region 1110' for displaying the information of the necklace type wearable device can be displayed dark.

FIGS. 12A to 12D is a diagram for one example of a process for selecting a prescribed wearable device from a plurality of wearable devices connected to a mobile terminal and then installing an application installed on the selected wearable device on the mobile terminal according to one embodiment of the present invention.

Figure 12A:
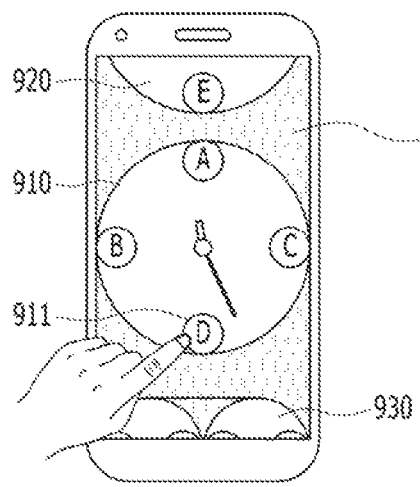
FIGS. 12A to 12D are diagrams for one example of a process for selecting a prescribed wearable device from a plurality of wearable devices connected to a mobile terminal and then installing an application installed on the selected wearable device on the mobile terminal according to one embodiment of the present invention.
Figure 12B:
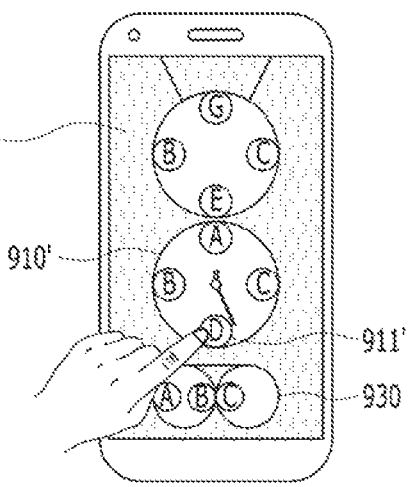
Figure 12C:
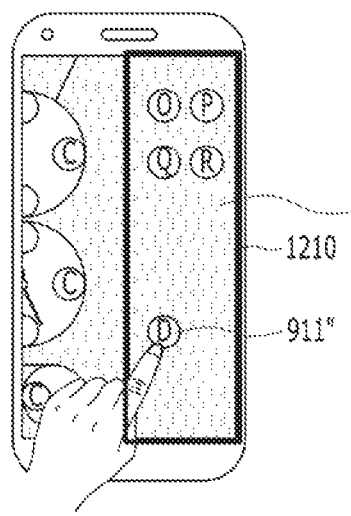
Figure 12D:
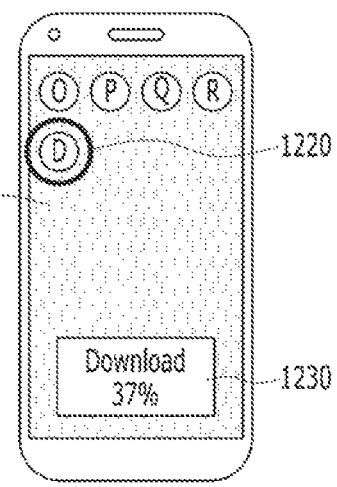

Referring to FIG. 12, in the former situation shown in FIG. 9A, if an icon 911 corresponding to a specific application is selected from information of a watch type wearable device through a touch input (e.g., a long touch) of a preset type [FIG. 12A], all wearable devices can be displayed on a single screen by zooming out from a screen [FIG. 12B]. In doing so, the corresponding icon enters a movable state 911' to correspond to a point of a touch with a pointer. If the corresponding icon is dragged to a right edge of a screen, a list of applications installed on the mobile terminal is displayed on a right region 1210 [FIG. 12C]. In doing so, if the icon 911" in the movable state has been moved into the right region 1210 and then released from the touch, an icon 1220 corresponding to the application is created as soon as installation starts. And, an installation progress diagram 1230 can be displayed [FIG. 12D].

FIGS. 13A to 13D are diagrams for another example of a process for installing an application installed on a mobile terminal on a prescribed one of a plurality of wearable devices connected to the mobile terminal according to one embodiment of the present invention.

Figure 13A:
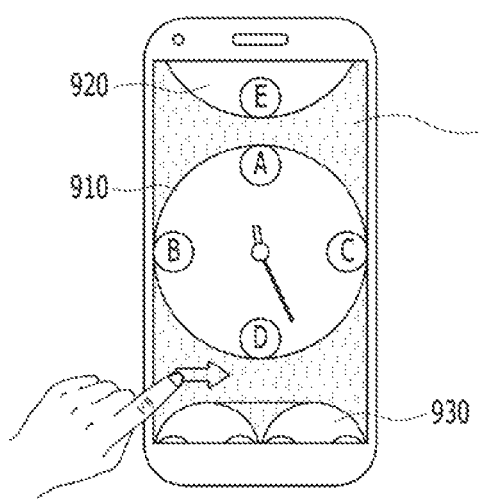
FIGS. 13A to 13D are diagrams for another example of a process for installing an application installed on a mobile terminal on a prescribed one of a plurality of wearable devices connected to the mobile terminal according to one embodiment of the present invention.
Figure 13B:
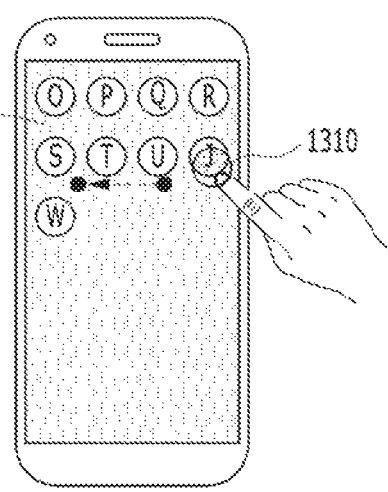
Figure 13C:
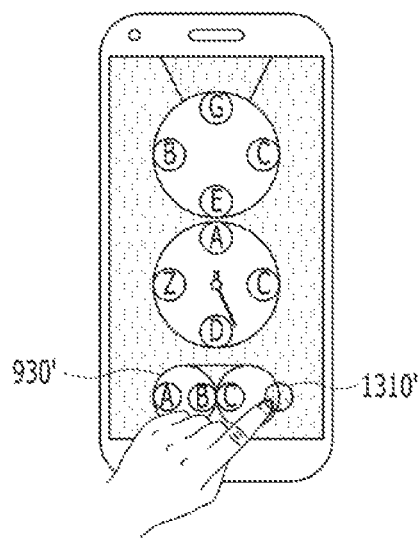
Figure 13D:
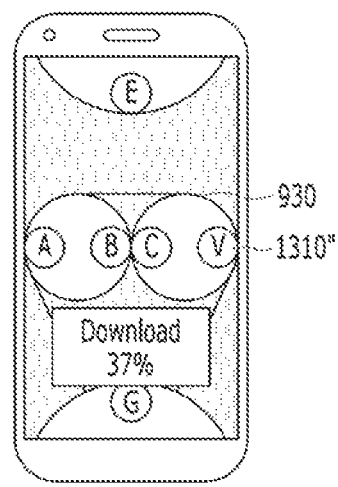

Referring to FIG. 13A, in the former situation shown in FIG. 9A, if a drag/flicking touch is inputted in a lateral direction, a scroll is generated in the corresponding direction and a list of applications installed on a mobile terminal can be displayed [FIG. 13B]. In doing so, if a user drags an icon 1310 corresponding to an installation-desired application to a screen edge, informations of all connected wearable devices can be displayed by zoom-out [FIG. 13C]. In this case, if the user cancels the touch from a region for displaying the information 930' of a glasses type wearable device, referring to FIG. 13D, the information 930 of the glasses type wearable device is displayed on a screen center and an installation of the installation-desired application can start. Hence, an icon 1310" corresponding to the installation-desired application can be created and an installation progress can be displayed as well.

In the following description, synchronization of application information is explained in detail with reference to FIG. 14.

FIGS. 14A to 14C are diagrams for one example of a method of performing synchronization of applications installed on a connected wearable device in a mobile terminal according to one embodiment of the present invention.

Referring to FIG. 14A, informations 1410, 1420 and 1430 of connected wearable devices are displayed. In doing so, if there is an application available for synchronization between the wearable devices, a synchronization icon 1440 can be displayed.

Referring to FIG. 14B, if the synchronization icon 1440 is selected, different visual effects 1460 and 1470 can be given to icons corresponding to the synchronization available applications, respectively. And, a cancel icon 1450 for cancelling this state can be displayed. If the synchronization icon 1440 is selected one more time, synchronization of all the synchronization available applications can be performed. In case that a user intends to select whether to perform the synchronization per application, the per-application synchronization can be performed in a manner of touching the visual effect 1470 displayed on the icon 1421 corresponding to a synchronization desired application [FIG. 14C].

Meanwhile, according to another embodiment of the present invention, various kinds of convenient functions can be provided by the mobile terminal through the interworking with a put-on wearable device.

FIGS. 15A to 15G are diagrams for examples of a method of checking an event occurring in the course of wearing a wearable device in a mobile terminal according to another embodiment of the present invention.

Figure 15A:
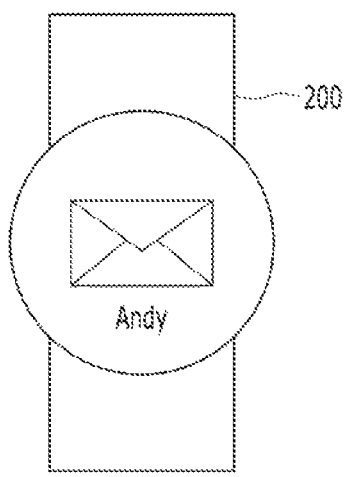
FIGS. 15A to 15G are diagrams for examples of a method of checking an event occurring in the course of wearing a wearable device in a mobile terminal according to another embodiment of the present invention.

Referring to FIG. 15A, an event of receiving a text occurs in a watch type wearable device 200 [FIG. 15A]. If a user knocks on a touch screen 151 in a turned-off state twice by wearing the wearable device in a prescribed time from the event occurrence [FIG. 15B], a popup window 1510 for confirming whether to check a message arriving at the wearable device through a mobile terminal can be displayed on a screen (e.g., home screen) as soon as the touchscreen 151 is turned on [FIG. 15C]. Thereafter, if the popup window 1510 is touched or a random region of the touchscreen 151 is touched twice again [i.e., knock on], the message arriving at the wearable device can be displayed through the touchscreen 151 of the mobile terminal [FIG. 15D]. In some cases, the step shown in FIG. 15A (c) can be omitted.

Figure 15B:
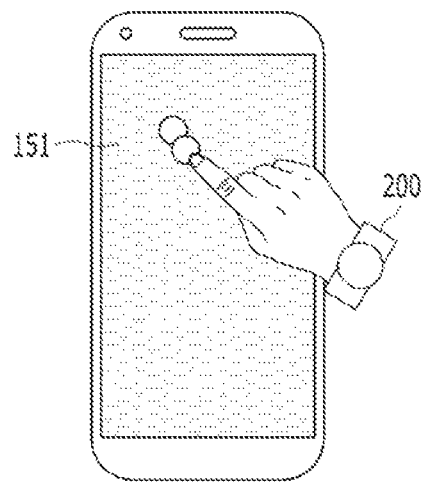
Figure 15C:
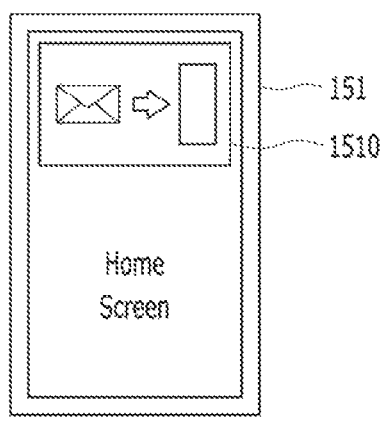
Figure 15D:
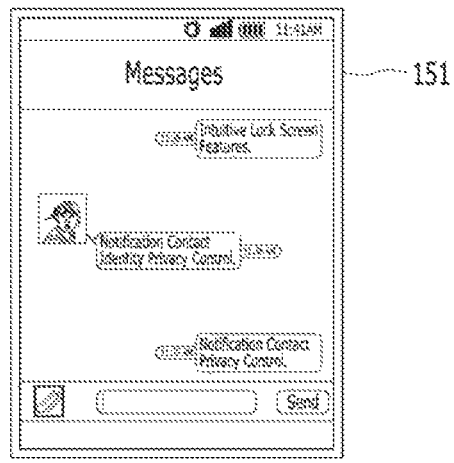
Figure 15E:
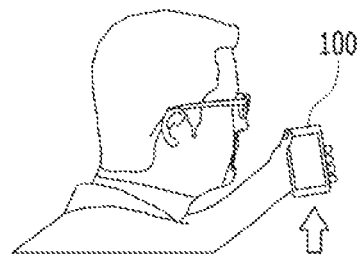

Referring to FIG. 15E, instead of the knock-on scheme described with reference to FIG. 15B, if a user makes a gesture of lifting up the mobile terminal 100 in a prescribed time from the occurrence of an event of receiving a text in a watch type wearable device 200 [FIG. 15E], the received text can be displayed like the example shown in FIG. 15D as soon as a touchscreen is turned on. In doing so, the controller 180 can determine a type of the gesture through a gyro sensor, an acceleration sensor or the like.

Figure 15F:
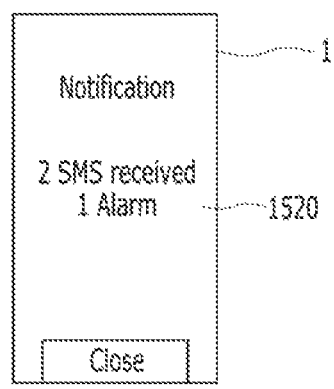
Figure 15G:
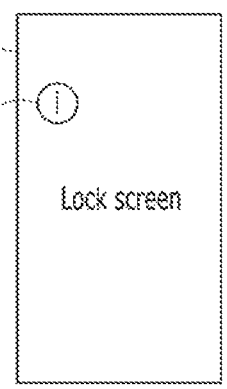

In case that a plurality of events occur, the events can be displayed as a list 1520 on the touchscreen 151 [FIG. 15F]. If a specific item is selected from the list 1520, a detailed information of the corresponding item can be displayed. If a lock screen is set in the mobile terminal, an indicator 1530 indicating an event occurrence can be displayed on displayed on the lock screen [FIG. 15G]. If the lock screen is unlocked, details of the corresponding event can be displayed.

The text message receptions shown in FIGS. 15A to 15G are examples of events, by which the present invention is non-limited. For instance, the present invention is applicable to various events including an alarm generation and the like.

Meanwhile, most of people desire to remember many things while exercising. The things may include a record for health, a memory of remembrance to recall that time and the like. Such things may not be recorded through one kind of a wearable device. And, it may be difficult to check the things through one kind of a wearable device. Therefore, the present embodiment can provide a solution for instantly checking all memories by collecting them into one place. Generally, a wearable device has information on a timing point at which the wearable device is put on. It is preferable to use a wearable device for the purpose of obtaining information recognized through a sensor due to a battery problem. A mobile terminal provides a relatively large display and is preferably configured to display informations obtained from wearable devices by integrating the obtained informations together owing to its operation capability. This is described in detail with reference to FIGS. 16A to 16D as follows.

FIGS. 16A to 16D are diagrams for one example of a method of displaying and utilizing data acquired from a plurality of wearable devices together in a mobile terminal according to another embodiment of the present invention.

Figure 16A:
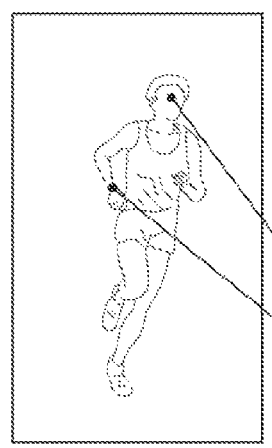
FIGS. 16A to 16D are diagrams for one example of a method of displaying and utilizing data acquired from a plurality of wearable devices together in a mobile terminal according to another embodiment of the present invention.
Figure 16B:
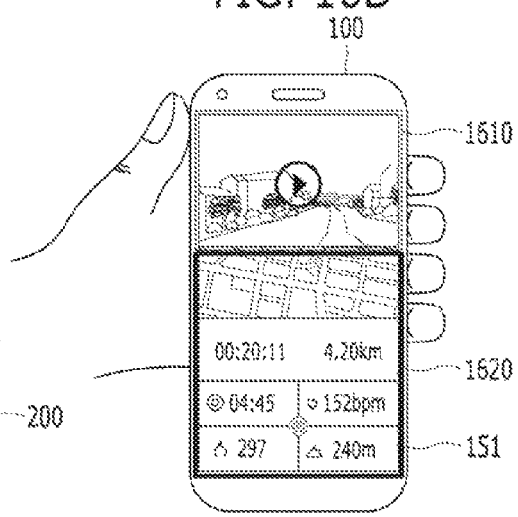

Referring to FIG. 16A, a user exercises while wearing a glasses type wearable device 200" and a watch type wearable device 200 together. In doing so, a video can be taken in the glasses type wearable device 200" while a user's heartbeat rate and moving path can be obtained by the watch type wearable device 200. If the controller 180 determines a case that a moving speed is reduced due to a user's walking stop or the like or a case that the user makes a gesture of lifting up the mobile terminal using the information obtained through the position location module 15 or the sensing unit 140, the controller 180 can display the informations obtained from the respective wearable devices together. For instance, referring to FIG. 16B, the video taken through the glasses type wearable device 200" in the course of exercising is displayed on a top part 1610 of the touchscreen 151 and the path and heartbeat rate information obtained through the watch type wearable device 200 can be displayed on a region 1620 below the top part 1610.

Figure 16C:
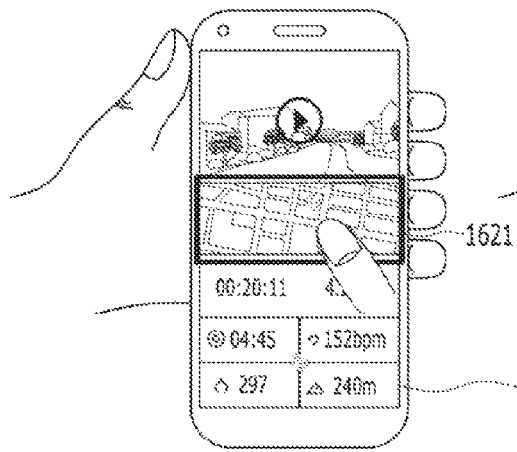
Figure 16D:
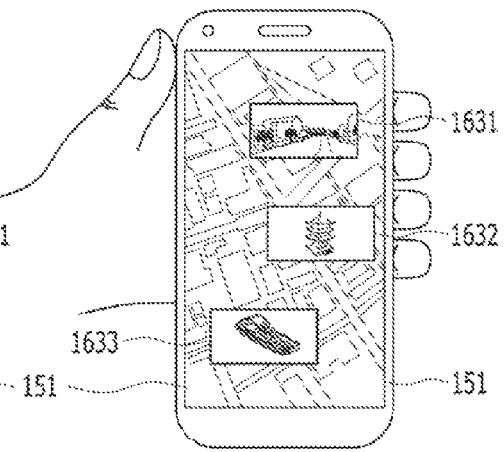

In doing so, if a region 1621 for displaying the moving path information is selected [FIG. 16C], a detailed moving path information can be displayed as a full screen and thumbnails 1631, 1632 and 1633 of videos taken on the path can be displayed to correspond to the video-taken locations [FIG. 16D].

Figure 17A:
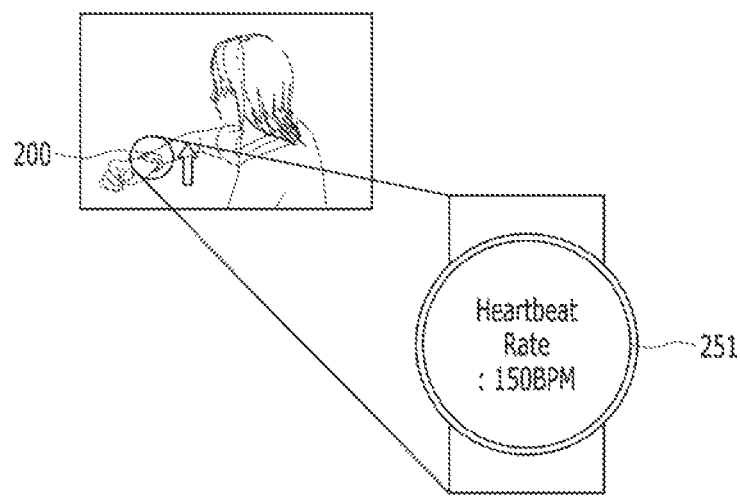
FIGS. 17A to 17C are diagrams for one example of a method of checking data acquired from a wearable device according to another embodiment of the present invention.
Figure 17B:
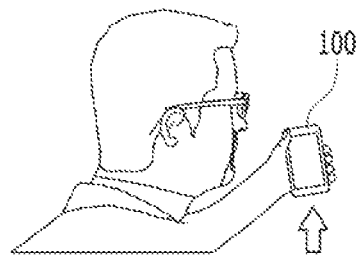
Figure 17C:
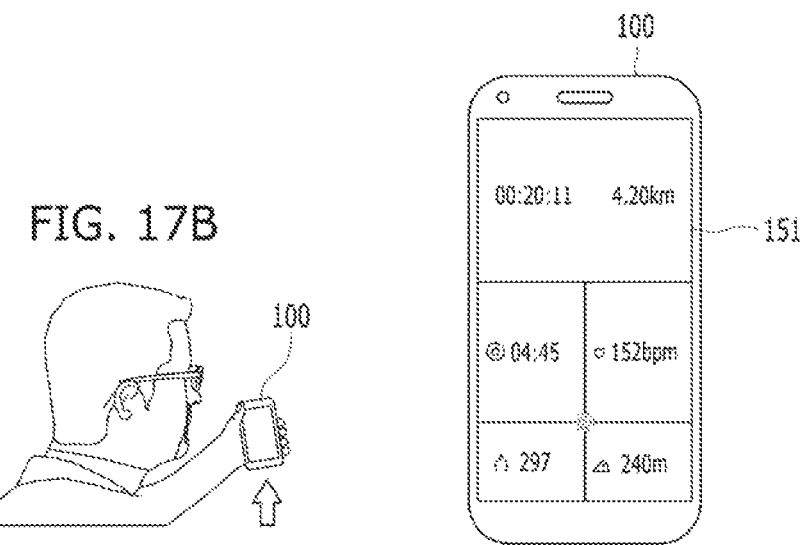

FIGS. 17A to 17C are diagrams for one example of a method of checking data acquired from a wearable device according to another embodiment of the present invention.

Referring to FIGS. 17A to 17C, while such a default information as a watch is displayed on a watch type wearable device in the course of exercising, if a user stops exercising and makes a gesture of lifting up the watch type wearable device, a heartbeat rate information can be displayed on a touchscreen of the watch type wearable device [FIG. 17A]. After the exercising, if the user makes a gesture of lifting up a mobile terminal 100 [FIG. 17B], health related information collected during the exercising can be displayed together [FIG. 17 C].

FIGS. 18A to 18D are diagrams for one example of a method of checking data acquired from one wearable device in another wearable device according to another embodiment of the present invention.

In FIGS. 18A to 18D, assume a situation right after taking a photo through a glasses type wearable device.

Figure 18A:
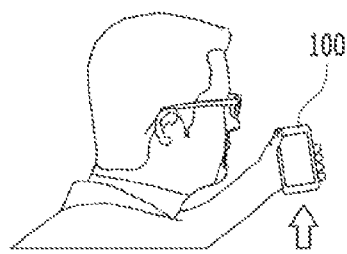
FIGS. 18A to 18D are diagrams for one example of a method of checking data acquired from one wearable device in another wearable device according to another embodiment of the present invention.

Referring to FIG. 18A, if a user makes a gesture of lifting up a mobile terminal 100 right after photographing or within a predetermined time, a touchscreen is automatically turned on and a photo taken through a glasses type wearable device can be directly displayed on the touchscreen. If a lock screen is set, the taken image can be displayed on the lock screen.

Figure 18B:
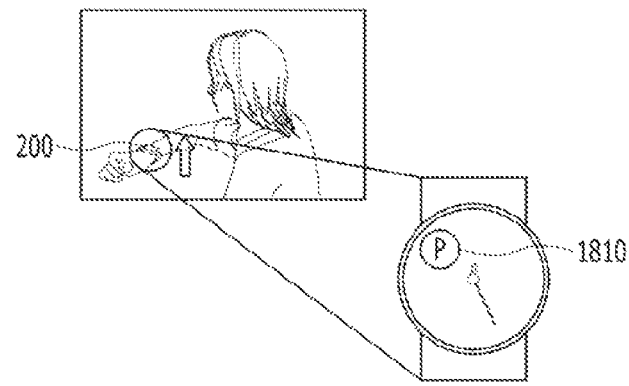
Figure 18C:
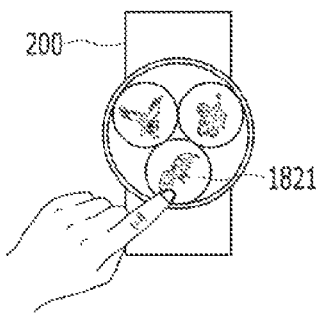
Figure 18D:
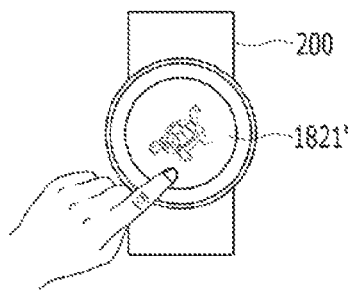

If the user makes a gesture of lifting up a watch type wearable device in a predetermined time from photographing, an icon 1810 indicating that a photo check is possible can be displayed on the watch type wearable device [FIG. 18B]. If the icon 1810 is selected, thumbnails of images taken through a glasses type wearable device can be displayed [FIG. 18C]. If a specific thumbnail 1821 is selected from the displayed thumbnails, an image 1821' corresponding to the selected thumbnail can be displayed by being enlarged [FIG. 18D]. In doing so, if the user touches the image 1821, a microphone of the watch type wearable device can be activated. And, a function (e.g., SNS transmission, etc.) corresponding to a voice command inputted through the microphone by the user can be performed on the image.

Providing Linked Function Through Connection Between Wearable Device and External Display Device Assume that an external display device mentioned in the following description includes a digital signage. The digital signage (hereinafter abbreviated DS, for clarity) is an outdoor advertisement of digital information using a display and means an advertisement panel capable of controlling advertisement contents through a communication network by a control center. The digital signage (DS) can be frequently seen in such a place having a large floating population as a subway station, a bus stop, an apartment, an elevator, a back and the like. Generally, the digital signage operates in a manner that advertisements in simple video configuration with sound are alternately displayed per time slot. Yet, according to the present invention, the digital signage includes a wireless communication unit and a touchscreen at least. And, assume that the digital signage can further include at least one module corresponding to each of the former modules shown in FIG. 1.

According to another embodiment of the present invention, a mobile terminal and controlling method thereof are provided, by which more convenient functions can be provided in a manner that the mobile terminal is connected to an external display device. In particular, according to the present embodiment, information on a wearable device put on by a user is displayed on an external display device or application management can be conducted by the external display device. And, information displayed through the external display device can be transferred to the wearable device.

The above description is explained in detail with reference to FIG. 19 as follows.

Figure 19:
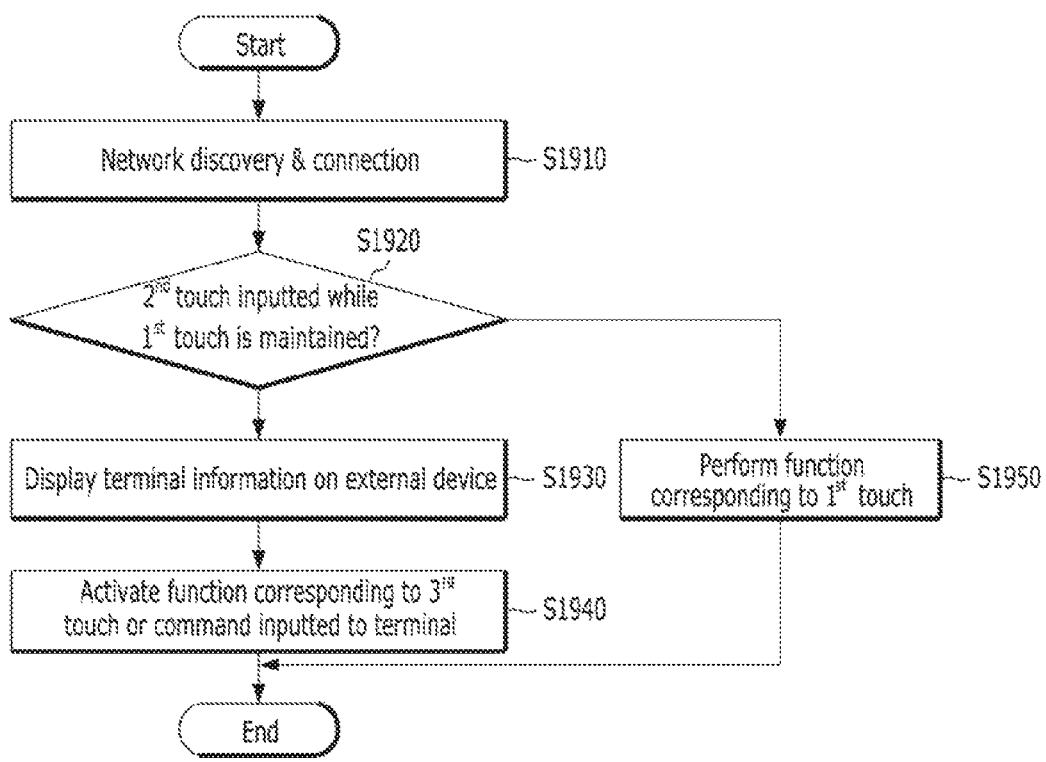
FIG. 19 is a flowchart for one example of a process for performing a linked operation by connecting a wearable device and an external display device to each other according to another embodiment of the present invention.

FIG. 19 is a flowchart for one example of a process for performing a linked operation by connecting a wearable device and an external display device to each other according to another embodiment of the present invention.

Referring to FIG. 19, first of all, network discovery and connection can be performed [S1910]. For the present process, a DS side can always activate a wireless communication module (e.g., Bluetooth, Wi-Fi, etc.) in order for a wearable device to discover a DS. If the wearable device successfully discovers the DS, the wearable device finishes a prescribed initial registration procedure with the DS in accordance with a corresponding communication protocol and is then able to establish a data path.

After a wireless data path has been established between the two devices, while a $1^{st}$ touch is inputted to a touchscreen of the DS and then maintained thereon without being cancelled, if a $2^{nd}$ touch is inputted [S1920], the controller 180 can control an information of at least one currently connected wearable device to be displayed in a prescribed configuration [S1930].

In this case, the $1^{st}$ touch can be inputted to a random point on the touchscreen. And, the $2^{nd}$ touch is preferably inputted in a predetermined pattern to a point different from the $1^{st}$ touch inputted point. of course, both of the $1^{st}$ touch and the $2^{nd}$ touch can be simultaneously inputted or the $2^{nd}$ touch can be inputted plural times within a prescribed time, depending on settings.

The currently connected wearable devices can be displayed as a list. The currently connected wearable devices can be displayed in a manner that visual effects are given to the currently connected wearable devices to correspond to their shapes, respectively. An application installed on each wearable device or a function executable through the installed application can be displayed together. If a plurality of the currently connected wearable devices exist, a prescribed wearable device can be selected from the currently connected wearable devices.

Moreover, the displayed wearable device information is delivered to the DS after the data path establishment irrespective of a presence or non-presence of the input of the $1^{st}$ touch/$2^{nd}$ touch and can be updated by real time or prescribed periods. Alternatively, the displayed wearable device information may be delivered to the DS from the wearable device when the $2^{nd}$ touch is inputted in the course of maintaining the $1^{st}$ touch. The information of the wearable device may include a type of the wearable device, an information of an application installed on or currently running in the wearable device, an identification information (e.g., phone number, email information, account information, user information, etc.) of the wearable device and the like.

Thereafter, various functions corresponding to a $3^{rd}$ touch inputted to the touchscreen of the DS or control signals transmitted to the DS from the wearable device can be performed by the DS [S1940]. Information according to the result from performing the function can be transmitted to the wearable device or may be managed by the DS only irrespective of the wearable device. The control signal transmitted to the DS from the wearable device may be attributed to a user's manipulation on the wearable device or may be automatically transmitted in accordance with a determination made by the wearable device.

Meanwhile, if the $2^{nd}$ touch is not inputted in the course of maintaining the $1^{st}$ touch, as the $1^{st}$ touch is cancelled, a function corresponding to the $1^{st}$ touch can be performed by the DS [S1950].

In the following description, a process for establishing a wireless data path between a wearable device and a DS is explained in detail with reference to FIGS. 20A to 20D.

FIGS. 20A to 20D are diagrams for one example of a process for connecting a wearable device and an external display device to each other according to another embodiment of the present invention.

Figure 20A:
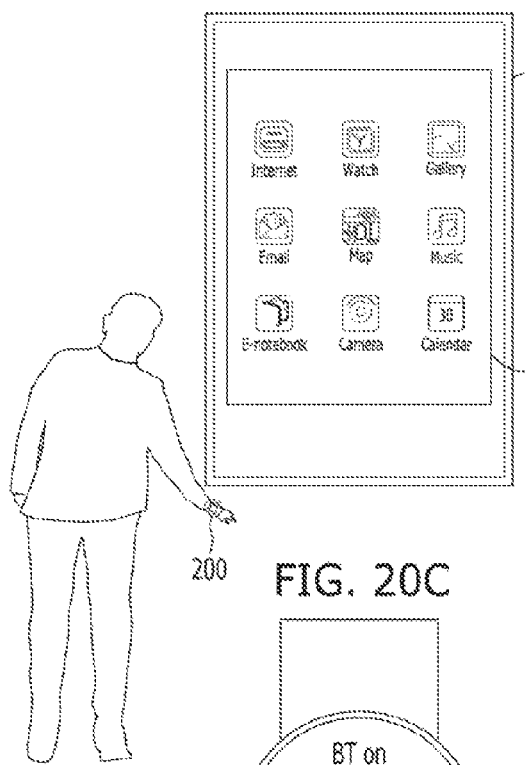
FIGS. 20A to 20D are diagrams for one example of a process for connecting a wearable device and an external display device to each other according to another embodiment of the present invention.
Figure 20B:
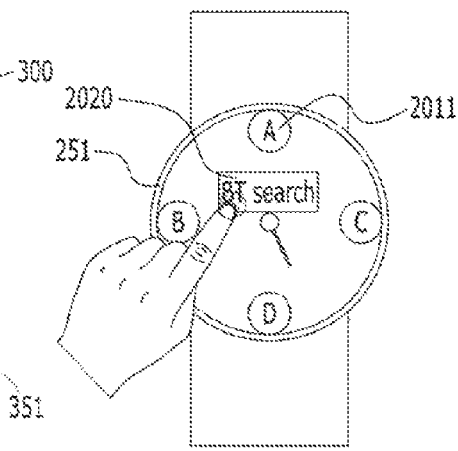

Referring to FIG. 20A, while a user wears a watch type wearable device 200 and is located nearby a DS 300 including a touchscreen 351 (e.g., in the coverage of a connection desired communication system such as BT and the like), the user is able to page a wireless connection setting menu by manipulating the wearable device 200. Hence, referring to FIG. 20B, a menu 2020 for discovering adjacent Bluetooth devices can be displayed on a touchscreen 251 of the wearable device 200. In doing so, the hands of a watch corresponding to a current hour (or numerals corresponding to the current hour in case of indicating a time digitally) can be displayed on the touchscreen 251. And, a plurality of icons/indicators 2011 can be displayed on the dial edges of the watch. Each of the icons or indicators may correspond to a single application installed on the wearable device or an application group including a plurality of applications installed on the wearable device or may indicate an operating state of the wearable device. The number of the displayed icons/indicators may follow a preset number according to a recently used order or a user-set priority or other icons/indicators can be displayed through a scroll. In the present specification, a configuration of each of the icons or indicators is unified into a scheme of representing alphabet within a circle. If the alphabet is different, it may mean a different type of icon or indicator. If the alphabet is same, it may mean the same type. This is provided for clarity and convenience of description only. Hence, it is apparent to those skilled in the art that the present invention is non-limited by the configurations and deployed positions of the icons/indicators. Such idea can exactly apply to a wearable device displayed on DS in the following description.

Figure 20C:
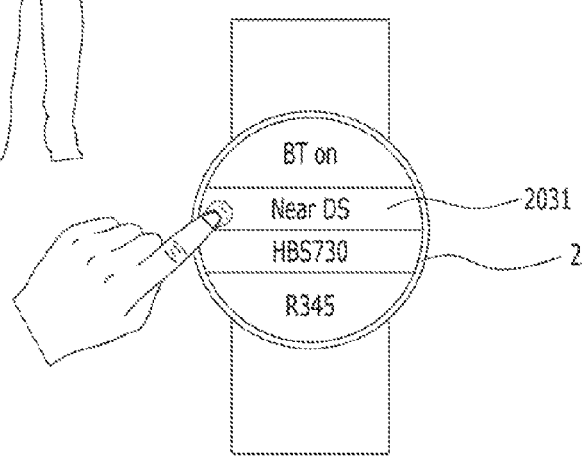
Figure 20D:
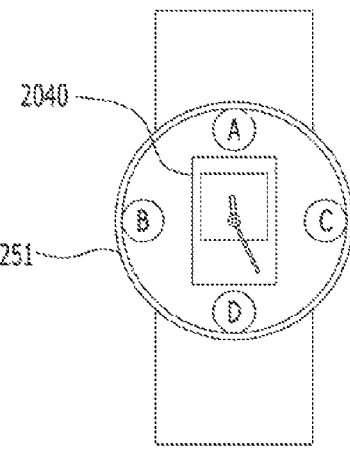

As the Bluetooth search is initiated, referring to FIG. 20C, a scan result is displayed. If the user selects an item 2031 corresponding to the nearby DS, a controller of the wearable device can establish a data path with the DS by Bluetooth by controlling a wireless communication module provided to the wearable device. As the data path establishment is complete, a configuration 2040 corresponding to the DS can be displayed on the touchscreen 241 of the wearable device [FIG. 20D].

In the following description, a process for a connected DS to page an information of a wearable device is explained in detail with reference to FIGS. 21A to 21D and FIG. 22. In FIGS. 21A to 21D and FIG. 22, assume a situation after the completion of establishment of a wireless data path.

FIGS. 21A to 21D are diagrams for one example of a process for displaying information of a wearable device on an external display device according to another embodiment of the present invention.

Figure 21A:
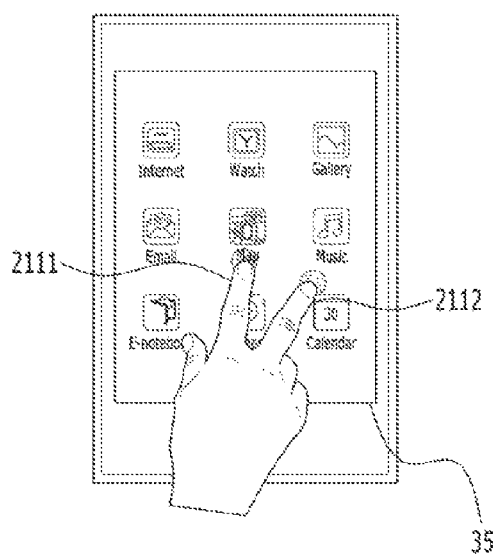
FIGS. 21A to 21D are diagrams for one example of a process for displaying information of a wearable device on an external display device according to another embodiment of the present invention.
Figure 21B:
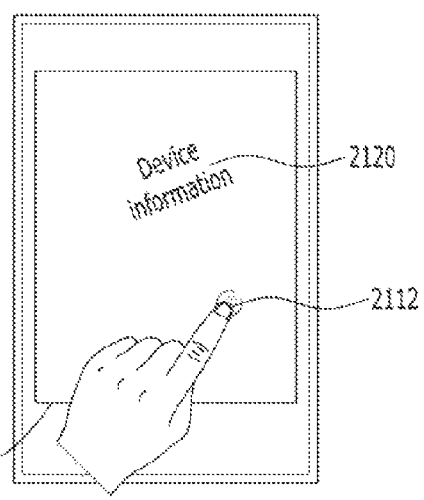
Figure 21C:
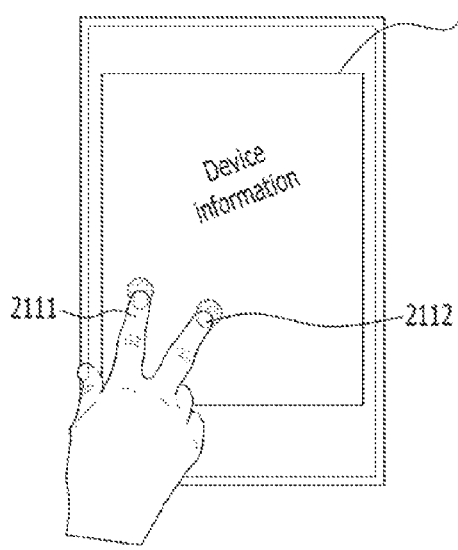
Figure 21D:
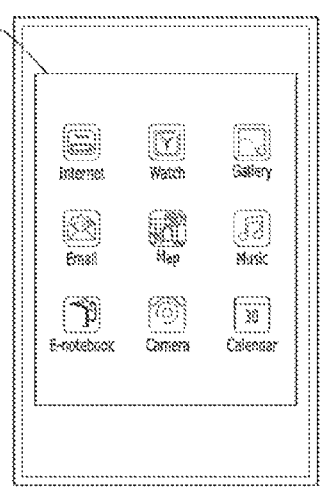

Referring to FIGS. 21A to 21D, while a random point on a touchscreen 351 of a DS is touched with a single finger 2111, if the touchscreen 351 is touched with another finger 2112 [FIG. 21A], an information 2120 of a wearable device can be displayed in a prescribed configuration [FIG. 21B]. In this case, a detailed configuration of displaying the information of the wearable device shall be described later. In doing so, it is not necessary for the former finger 2111 to touch the touchscreen 351 in the first place. Alternatively, both fingers can touch the touchscreen 351 at the same time. If the touchscreen 351 is touched with the latter finger 2112 plural times in a prescribed time or only if the time taken to maintain the touches with the two fingers exceeds a predetermined time, the wearable device may be displayed. In the situation shown in FIG. 21B, a $3^{rd}$ touch with a single finger 2111 can be inputted. When the information of the wearable device is displayed, if a $2^{nd}$ touch is inputted while a $1^{st}$ touch is maintained [FIG. 21C], a screen previous to displaying the information of the wearable device can be displayed again [FIG. 21D].

In this case, when a data path with the wearable device is established only, if the $1^{st}$ touch and the $2^{nd}$ touch are inputted in a preset pattern, the information of the wearable device can be displayed irrespective of the information displayed on the touchscreen of the DS. Of course, in accordance with settings, while a specific screen (e.g., a homescreen of the DS, specific information or an execution screen of a pre-authorized application for interworking with the wearable device) is displayed on the DS only, if the $1^{st}$ touch and the $2^{nd}$ touch are inputted in a preset pattern, the information of the wearable device can be displayed.

Figure 22:
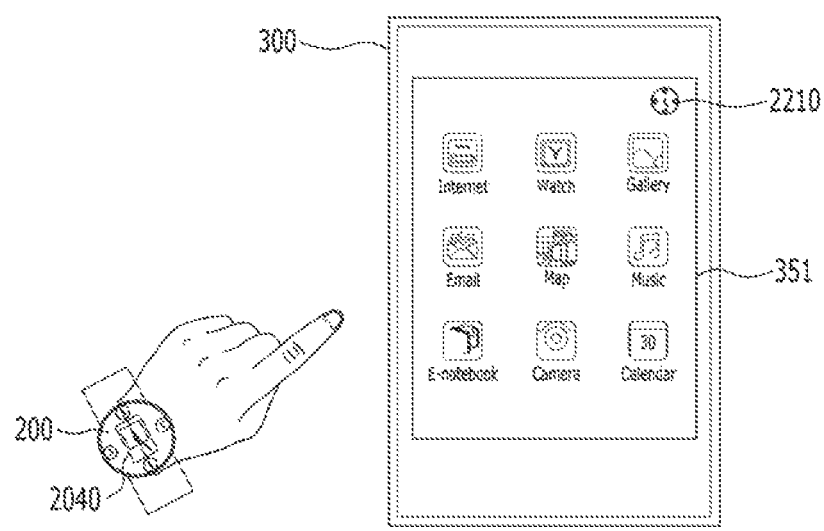
FIG. 22 is a diagram for one example of a method of inputting a command for displaying information of a connected wearable device on an external display device according to another embodiment of the present invention.

FIG. 22 is a diagram for one example of a method of inputting a command for displaying information of a connected wearable device on an external display device according to another embodiment of the present invention.

Referring to FIG. 22, as a data path with the DS is established, a configuration 2040 corresponding to the DS can be displayed on a touchscreen of the wearable device 200. An icon 2210 corresponding to the wearable device 200 can be displayed during a prescribed time (or continuously while connected) on a screen (e.g., home screen) displayed on the touchscreen 351 of the DS. If the icon 2210 is selected through a touch input before disappearing, the information of the connected wearable device can be displayed on the touchscreen 351 of the DS.

In the following description, a display configuration depending on a type of a wearable device is explained in detail with reference to FIG. 23 as follows.

FIG. 23 is a diagram for one example of a configuration of displaying an information of a wearable device in accordance with a type of the wearable device on an external display device according to one embodiment of the present invention.

In FIGS. 23A to 23C, assume that a command for displaying information of a connected wearable device has been inputted by one of the former methods described with reference to FIGS. 21A to 21D and FIG. 22.

Referring to FIG. 23A, in case that a wearable device is a watch type 200, information of the wearable device can be displayed within silhouette of a watch shape 2310.

Referring to FIG. 23B, in case that a wearable device is a necklace type 200', information of the wearable device can be displayed within silhouette of a necklace shape 2320.

Referring to FIG. 23C, in case that a wearable device is a glasses type 200", information of the wearable device can be displayed within silhouette of a glasses shape 2330.

Meanwhile, a list (i.e., use history) of recently used functions can be displayed on a silhouette top region 2340 of the wearable device. In this case, the recently used functions may include the functions used by the wearable device before connection to the DS or the functions displayed/executed on the touchscreen of the DS through the connection to the DS. Each item in the list may have a thumbnail configuration corresponding to an activated image of the corresponding function. And, each item in the list may include one of a name of the corresponding function, a status of the corresponding function, an icon of the corresponding function, and a combination thereof. And, the meanings of the circular icons deployed within the silhouette as the same as mentioned in the foregoing description. If the information of the connected wearable device displayed through the $1^{st}$ touch and the $2^{nd}$ touch is displayed to correspond to a shape of the corresponding device, it can facilitate the visual discrimination of devices. And, it is unnecessary for the information of the wearable device to correspond to the shape. Meanwhile, if a specific icon is selected, a detailed information (e.g., an active screen, size, origin, authority, active state, storage location, etc.) of an application or operating status corresponding to the selected icon can be displayed [not shown in the drawing].

In the following description, when a plurality of wearable devices are currently connected to an external display device, a display configuration and a selecting method are explained with reference to FIGS. 24A and 24B.

Figure 24A:
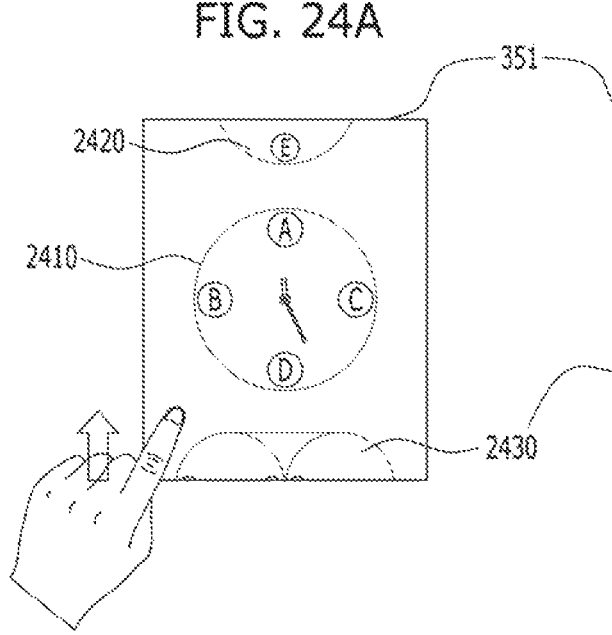
FIGS. 24A and 24B are diagrams for one example of a configuration that information of a wearable device is displayed on an external display device connected to a plurality of wearable devices according to another embodiment of the present invention.
Figure 24B:
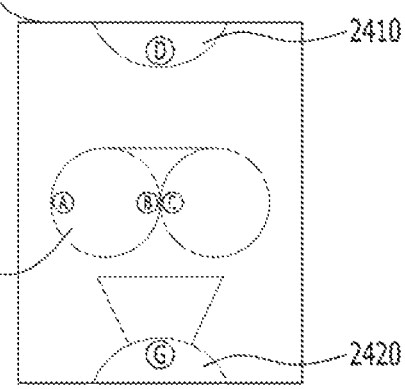

FIGS. 24A and 24B are diagrams for one example of a configuration of displaying an information of a wearable device on an external display device connected to a plurality of wearable devices according to one embodiment of the present invention.

In FIGS. 24A and 24B, while a wearable device of a watch type, a wearable device of a necklace type and a wearable device of a glasses type are connected to a DS, assume that a command for displaying information of the wearable device is inputted to the DS.

Referring to FIG. 24A, an information 2410 of the watch type wearable device is displayed in the middle part of the touchscreen 351 of the DS. An information 2420 of the necklace type wearable device is displayed above the information 2410 of the watch type wearable device. And, an information 2430 of the glasses type wearable device is displayed below the information 2410 of the watch type wearable device. In this case, the order of arrangement of the devices can be determined in a manner that a previously/last used/connected device is arranged in the middle. In particular, FIG. 24A (a) shows a case that the watch type wearable device is connected or used last. Alternatively, the order of arrangement of the wearable devices may follow the order preset by a user. Alternatively, a currently put-on wearable device can be displayed in the middle of the touchscreen 151.

In doing so, if a user inputs a drag or flicking touch in an arrow direction (e.g., top direction) with a pointer, referring to FIG. 24B, a scroll is generated in the top direction so that the glasses type wearable device 2430 can be displayed in the middle.

In the following description, methods of managing information such as an application, a file and the like between wearable devices or between a wearable device and a DS are explained in detail with reference to FIGS. 24C to 26D. For clarity, assume that a target of management is an application. In this case, the management may include a process for installing an application, which is installed on a DS, on a connected wearable device, a process for installing an application, which is installed on a connected wearable device, on a DS, or a process for installing an application, which is installed on one wearable device, on another wearable device. Moreover, in case that the same application is installed on at least two of wearable devices currently connected to a DS, synchronization of application data may be included in the management of the present embodiment. Of course, if a content is not limited to an application, it is a matter of course that installation of an application can be substituted with a transfer/copy of a file or information item.

FIGS. 24C to 24E are diagrams for one example of a process for selecting a prescribed wearable device from a plurality of wearable devices connected to an external display device and then installing an application on the selected wearable device in the external display device according to one embodiment of the present invention.

Referring to FIGS. 24C to 24E, in the former situation shown in FIG. 24A, if an icon 2411 corresponding to a specific application is selected from information of a watch type wearable device through a touch input (e.g., a long touch) of a preset type [FIG. 24C], all wearable devices connected to a DS can be displayed on a single screen by zooming out from a screen [FIG. 24D]. In doing so, the corresponding icon enters a movable state 2411' to correspond to a point of a touch with a pointer. If the corresponding icon is dragged to a region for displaying an information 2430 of a glasses type wearable device and then released from the touch, an application corresponding to the icon can start to be installed on the glasses type wearable device. Hence, referring to FIG. 24E, an icon 2434 corresponding to the application is created from the region for displaying the information 2430 of the glasses type wearable device and an installation progress state 2440 can be displayed.

In doing so, in order to install an application, an application installation file is extracted from a device having the corresponding application installed thereon and then forwarded to an installation target device. Alternatively, an installable address (e.g., URL) or an identification information of an application providing service can be forwarded to the target device only. Of course, if a direct inter-wearable device communication is not supported, the DS can relay the corresponding information.

In the following description, a process for installing an application, which is already installed on a DS, on a wearable device is described in detail with reference to FIGS. 25A to 25G.

FIGS. 25A to 25G are diagrams for examples of installing an application, which is installed on an external display device, on a wearable device connected to the external display device according to one embodiment of the present invention.

Figure 25A:
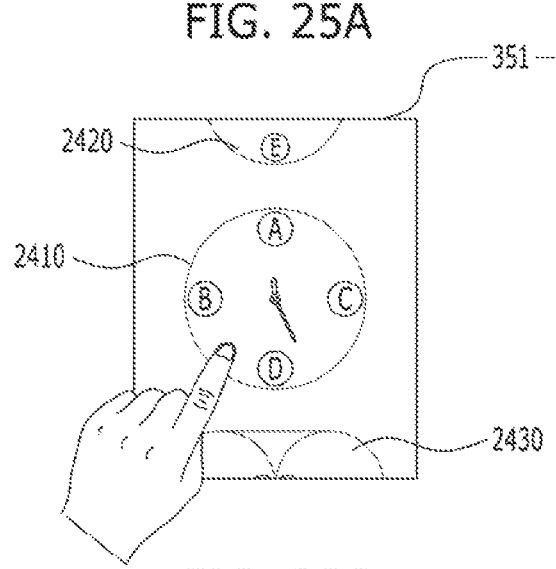
FIGS. 25A to 25G are diagrams for one example of a process for installing an application, which is already installed on an external device, on a wearable device connected to the external display device according to another embodiment of the present invention.
Figure 25B:
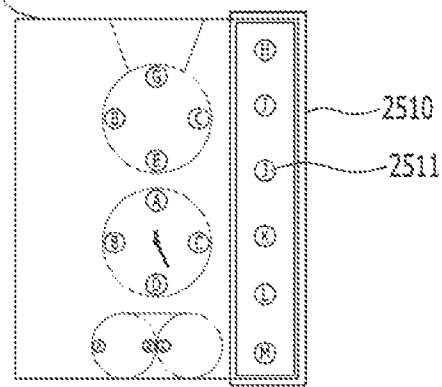

Referring to FIGS. 25A to 25D, in the former situation shown in FIG. 24A, if a region having no icons displayed thereon is selected from a region for displaying an information 2410 of a watch type wearable device through a touch input (e.g., a long touch) of a preset type [FIG. 25A], all wearable devices can be displayed on a single screen by zooming out from a screen [FIG. 25B]. In doing so, icons corresponding to applications installable on a wearable device among all the applications installed on a DS can be displayed on a right region 2510 of a screen. In this case, the right region 2510 can be scrolled in top-bottom and/or right-left direction so as to display other icons failing to be displayed thereon. In this case, if a user intends to install a specific application on the watch type wearable device, the user can drag an icon 2511 corresponding to the specific application to the region for displaying the information 2410 of the watch type wearable device.

Figure 25C:
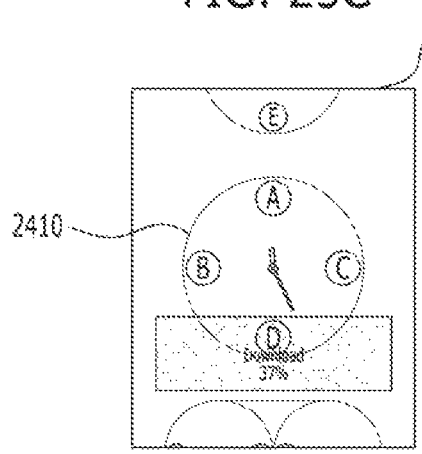
Figure 25D:
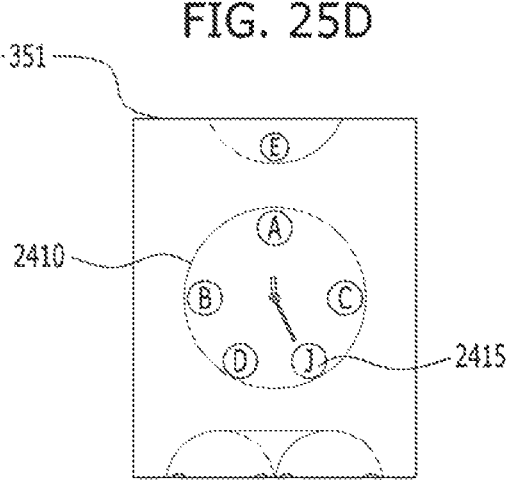
Figure 25G:
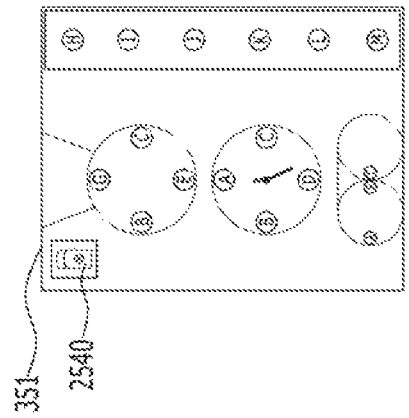
Figure 25F:
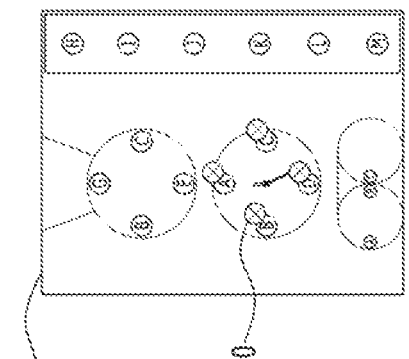

Hence, an installation progress diagram can be displayed as soon as the installation starts [FIG. 25C]. If the installation is complete, an icon 2415 corresponding to the installed application can be added to the region for displaying the information 2410 of the watch type wearable device [FIG. 25D].

Figure 25E:
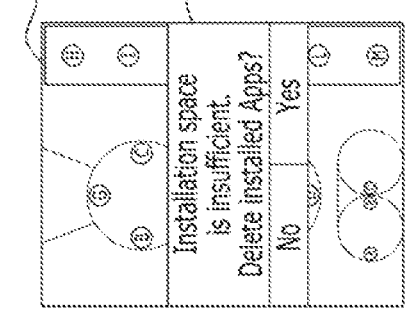

If the wearable device is short of storage space, a popup window 2520 indicating the shortage can be displayed [FIG. 25E]. If a user selects 'delete', a delete indicator 2530 can be displayed adjacent to each icon in the region for displaying the information of the watch type wearable device [FIG. 25F]. An application corresponding to the icon having its delete indicator selected can be removed from the corresponding device. Alternatively, a trash icon 2540 can be displayed instead of the delete indicator [FIG. 25G]. Moreover, a user can delete an application in a manner of dragging an icon corresponding to a deletion-desired application to the trash icon 2540.

FIGS. 26A to 26D are diagrams for another example of a process for installing an application, which is already installed on a mobile terminal, on a prescribed one of wearable devices connected to an external display device according to another embodiment of the present invention.

Figure 26A:
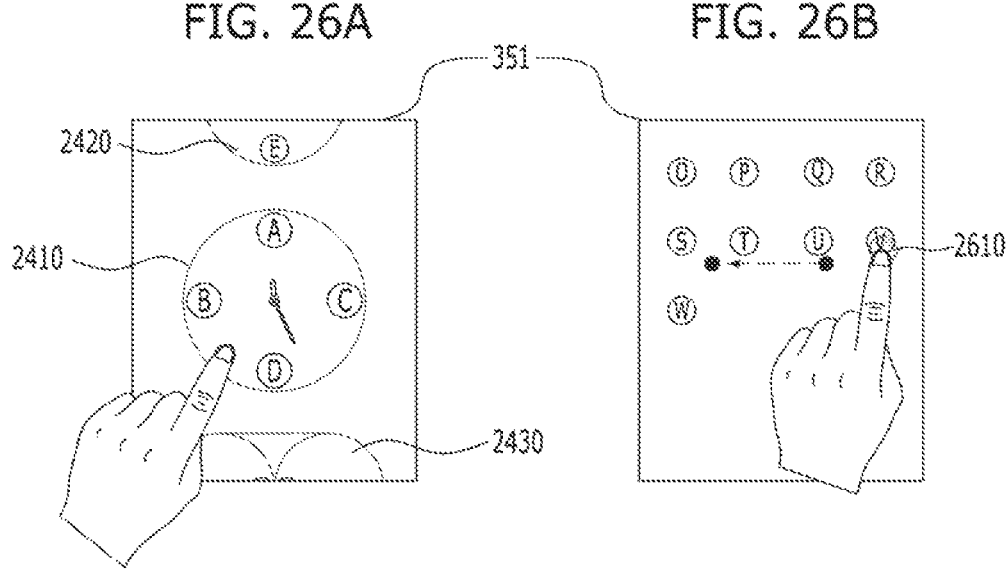
FIGS. 26A to 26D are diagrams for another example of a process for installing an application, which is already installed on a mobile terminal, on a prescribed one of wearable devices connected to an external display device according to another embodiment of the present invention.
Figure 26B:
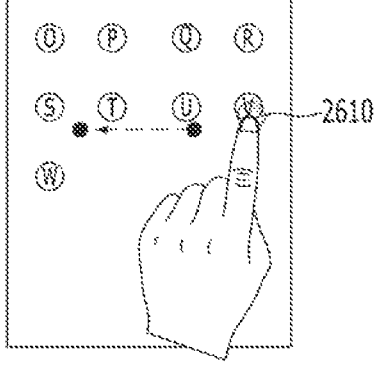
Figure 26C:
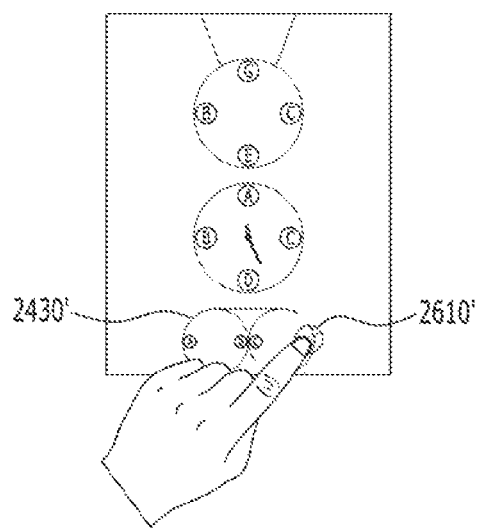
Figure 26D:
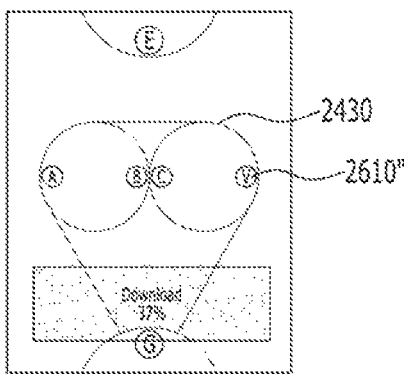

Referring to FIGS. 26A to 26D, in the former situation shown in FIG. 24A (a), if a drag/flicking touch is inputted in a lateral direction [FIG. 26A], a scroll is generated in the corresponding direction and a list of applications installed on a DS can be displayed [FIG. 26B]. In doing so, if a user drags an icon 2610 corresponding to an installation-desired application to a screen edge, informations of all connected wearable devices can be displayed by zoom-out [FIG. 26C]. In this case, if the user cancels the touch from a region for displaying the information 2430' of a glasses type wearable device, referring to FIG. 26D, the information 2430 of the glasses type wearable device is displayed on a screen center and an installation of the installation-desired application can start. Hence, an icon 2610" corresponding to the installation-desired application can be created and an installation progress can be displayed as well.

Each of the screens shown in FIGS. 24A to 26D is displayed as a full screen on the touchscreen 351 of the DS, by which the present invention is non-limited. And, it is apparent to those skilled in the art that each of the screens shown in FIGS. 24A to 26D can be displayed on a partial region of the touchscreen 351. For instance, each of the screens may be displayed on a region of the touchscreen 351 except the top region 2340 of the touchscreen 351 in the situation shown in FIGS. 23A to 23C and can be arranged to be scrollable not in portrait direction but in landscape direction.

In the following description, how to update a use history is explained in detail with reference to FIGS. 27A to 27C.

FIGS. 27A to 27C are diagrams for one example of a process for updating use history of a wearable device through an external display device according to another embodiment of the present invention.

Referring to FIG. 27A, after a wearable device has been selected, if a user selects a prescribed icon from a plurality of icons displayed on the touchscreen 351 of the DS, an information corresponding to the selected icon can be displayed as shown in FIG. 27B. In doing so, if the user inputs a command for paging information of the wearable device, the information corresponding to the selected icon can be delivered to the wearable device. Hence, referring to FIG. 27C, a corresponding information 2710 can be displayed as an initial item of a use history. And, a previous item A can be pushed to a right side.

FIGS. 28A to 28D are diagrams for one example of a process for checking information of a wearable device in an external display device and then updating a use history in accordance with the checked information according to another embodiment of the present invention.

Figure 28A:
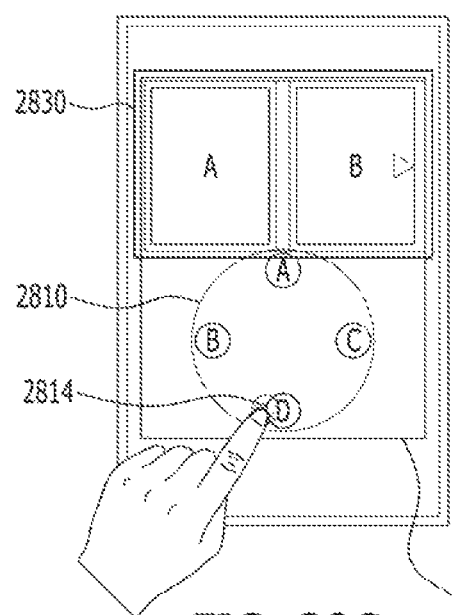
FIGS. 28A to 28D are diagrams for one example of a process for checking information of a wearable device in an external display device and then updating a use history in accordance with the checked information according to another embodiment of the present invention.
Figure 28B:
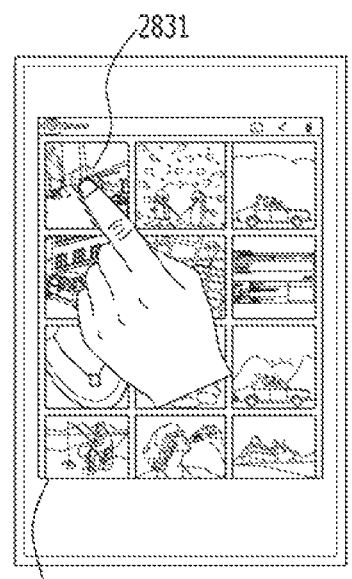
Figure 28C:
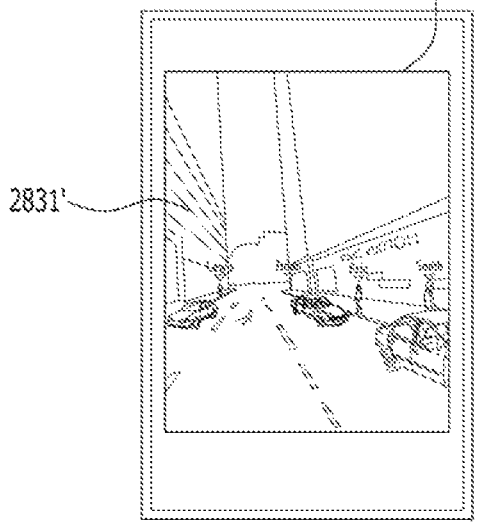
Figure 28D:
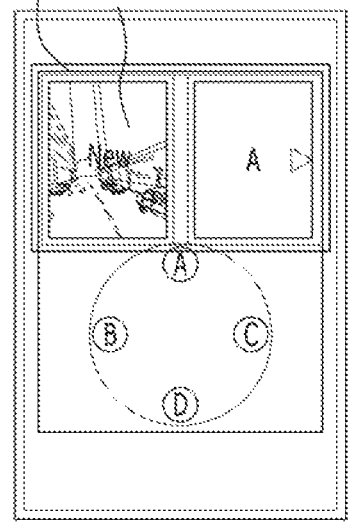

Referring to FIG. 28A, in a situation that information of a wearable device is displayed through the touchscreen 351 of the DS, a gallery icon 2814 displayed in a silhouette 2810 of the wearable device can be selected. Hence, referring to FIG. 28B, thumbnails of images saved in the wearable device can be displayed on the touchscreen 351 of the DS. In doing so, if a specific thumbnail 2831 is selected, referring to FIG. 28C, a corresponding image 2831' can be displayed as a full screen. In doing so, if a command for returning to the information of the wearable device is inputted, referring to FIG. 28D, an item 2823 corresponding to the image displayed as the full screen can be displayed on a use history of a top region 2820 in the first place.

In the following description, an interworking situation between an external display device and a wearable device is explained in detail with reference to FIGS. 29A to 29D and FIGS. 30A to 30D.

FIGS. 29A to 29D are diagrams for one example of a method of directly displaying a function executed in a wearable device on an external display device according to another embodiment of the present invention.

Figure 29A:
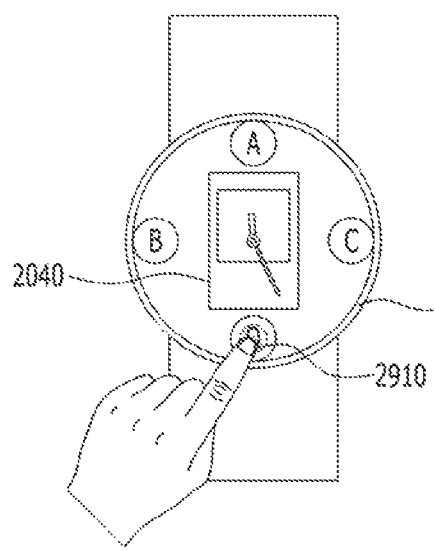
FIGS. 29A to 29D are diagrams for one example of a method of directly displaying a function executed in a wearable device on an external display device according to another embodiment of the present invention.
Figure 29B:
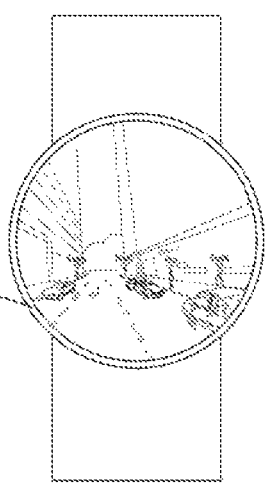
Figure 29C:
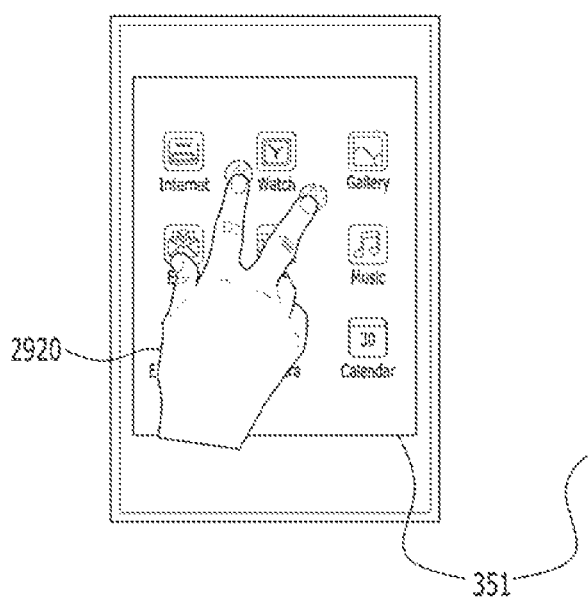
Figure 29D:
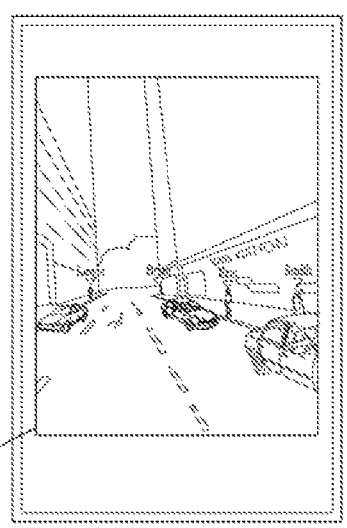

Referring to FIG. 29A, as a connection to the DS is completed, a silhouette 2040 of the DS can be displayed on the touchscreen 351 of the wearable device. In doing so, if a user selects a gallery icon 2910 from the wearable device, referring to FIG. 29B, a specific image can be displayed. In doing so, if the user inputs a $1^{st}$ touch and a $2^{nd}$ touch to the connected DS with a pointer 2920 [FIG. 29C], a specific image can be directly displayed as the information of the wearable device [FIG. 29D].

FIGS. 30A to 30D are diagrams for one example of a method of displaying a function executed in an external display device on a wearable device according to another embodiment of the present invention. Assume that the process shown in FIGS. 30A to 30D follows the former process shown in FIGS. 29A to 29D.

Figure 30A:
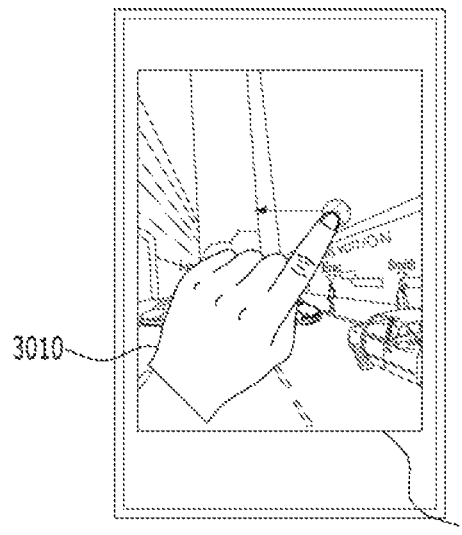
FIGS. 30A to 30D are diagrams for one example of a method of displaying a function executed in an external display device on a wearable device according to another embodiment of the present invention.
Figure 30B:
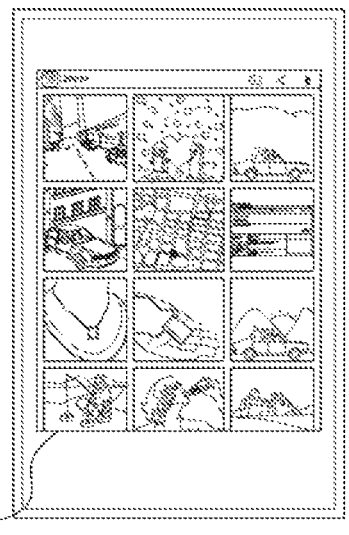
Figure 30C:
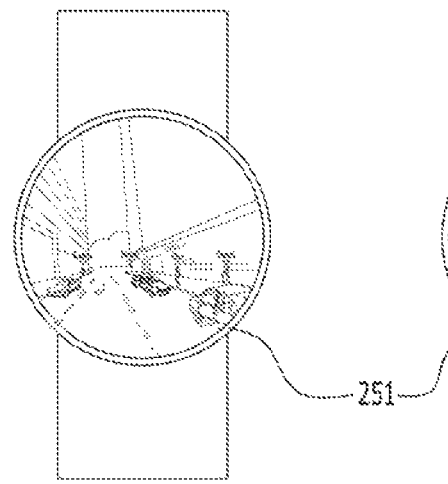
Figure 30D:
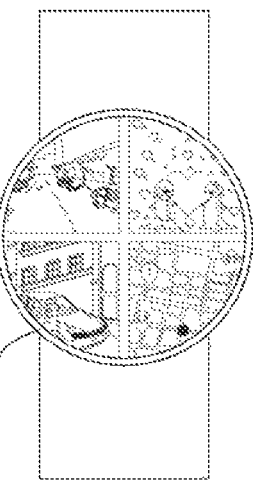

Referring to FIGS. 30A to 30D, if a command (e.g., a flicking in left direction, etc.) for returning to a previous screen is inputted to the touchscreen of the DS through a pointer 3010 [FIG. 30A], a thumbnail list can be displayed [FIG. 30B]. Thereafter, if a user checks the wearable device [FIG. 30C], a change of a job occurring in the DS is identically applied to the wearable device so that a screen corresponding to FIG. 30A can be changed into a screen corresponding to FIG. 30B [FIG. 30D].

FIGS. 31A to 31D and FIGS. 32A to 32D are diagrams for one example of a process for transmitting information displayed on an external display device to a wearable device according to another embodiment of the present invention.

Figure 31A:
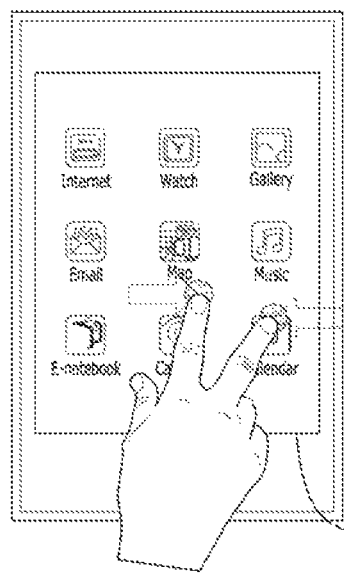
FIGS. 31A to 31D and FIGS. 32A to 32D are diagrams for one example of a process for transmitting information displayed on an external display device to a wearable device according to another embodiment of the present invention.
Figure 31B:
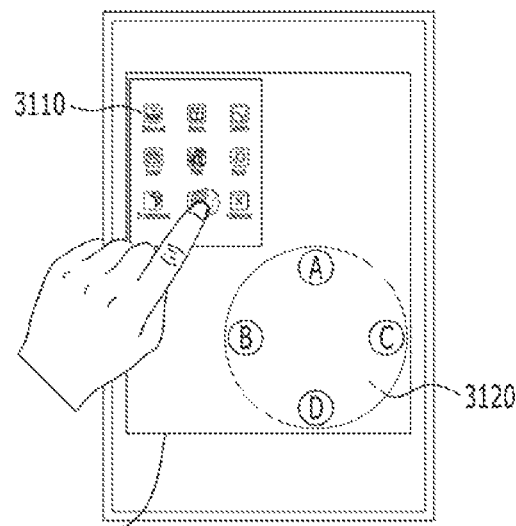
Figure 31C:
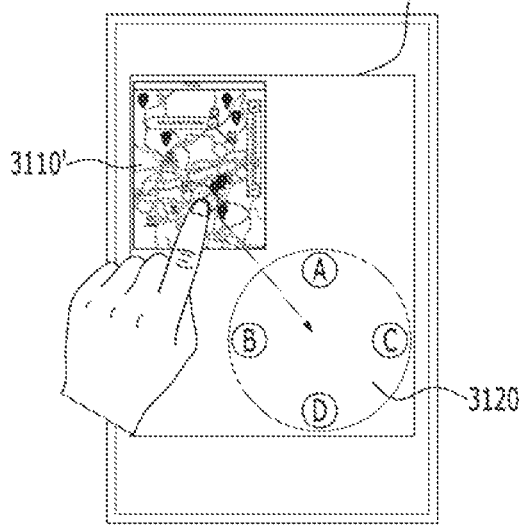
Figure 31D:
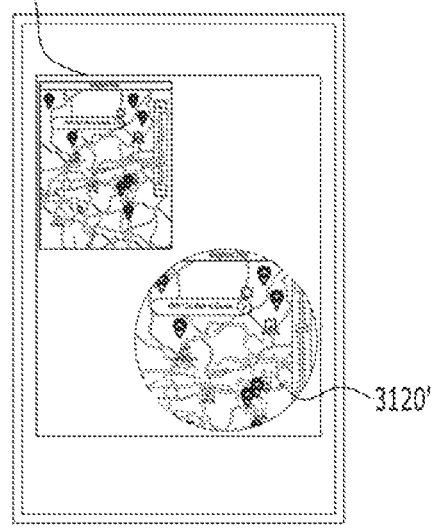
Figure 32A:
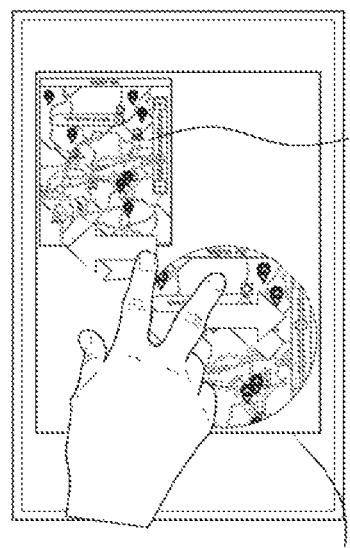
Figure 32B:
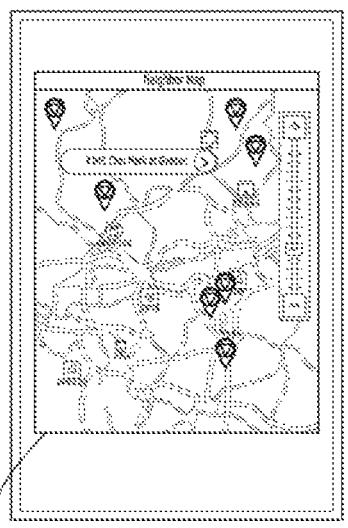
Figure 32C:
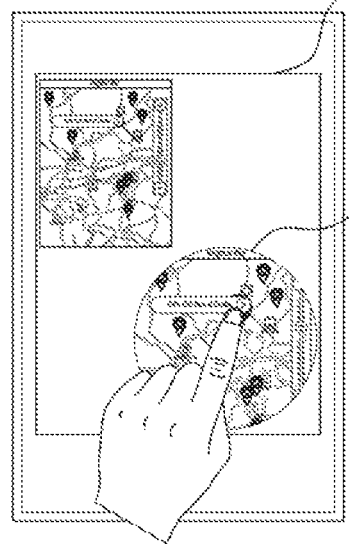
Figure 32D:
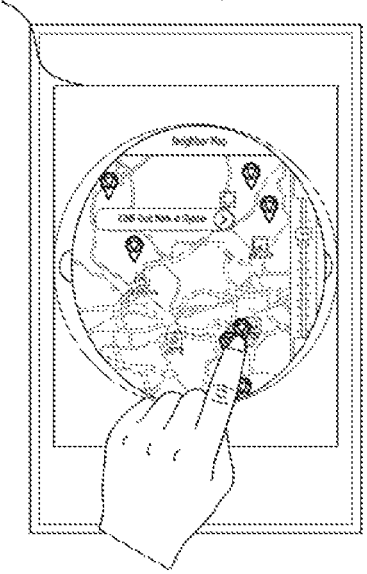

Referring to FIGS. 31A to 31D and FIGS. 32A to 32D, after a wearable device and a DS have been connected to each other, if a zoom-out touch is inputted to the touchscreen of the DS in order to pinch in two touch points [FIG. 31A], a screen 3110 displayed on the DS is reduced and a watch silhouette 3120 including information of the wearable device can be displayed on a vacant space together [FIG. 31B]. In doing so, if a user selects a specific icon from the reduced DS screen 3110, referring to FIG. 31C, an information 3110' corresponding to the selected icon can be displayed on the reduced DS screen. In this case, if the user drags the information 3110' displayed on the reduced DS screen to the watch silhouette 3120, referring to FIG. 31D, the corresponding information is transmitted to the wearable device and a corresponding information 3120' can be displayed within the watch silhouette. In this case, if the user inputs a zoom-in touch [FIG. 32A], the DS screen can return to the full screen [FIG. 32B]. Moreover, if a watch silhouette 3120' is touched (e.g., a long touch, a double touch, etc.) [FIG. 32C], the watch silhouette can be displayed as a full screen [FIG. 32D].

FIG. 33 is a diagram for one example of a method of transmitting a coupon according to another embodiment of the present invention.

Figures 33A, 33B:
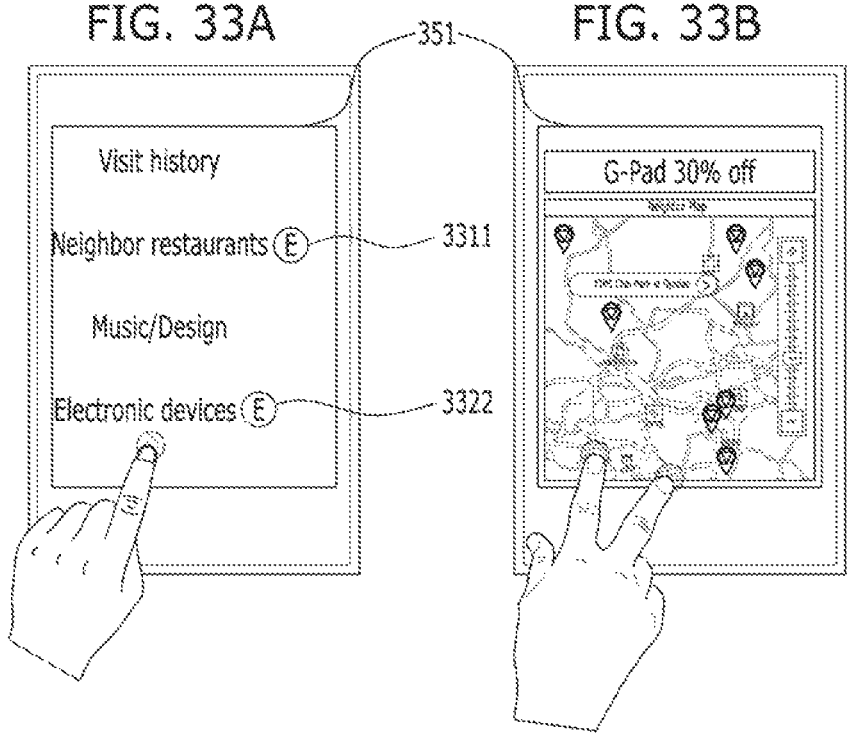
FIGS. 33A and 33B are diagrams for one example of a method of transmitting a coupon according to another embodiment of the present invention.
Figure 34A:
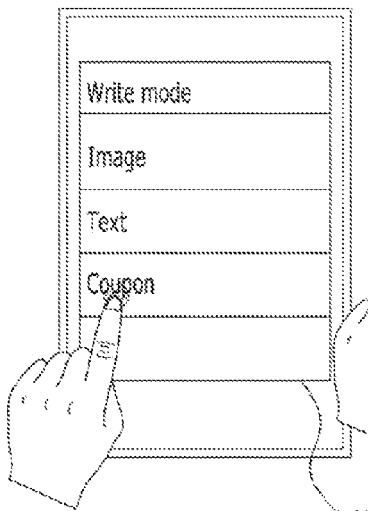
FIGS. 34A to 34F are diagrams for one example of a method of transmitting a coupon to another device according to another embodiment of the present invention.
Figure 34B:
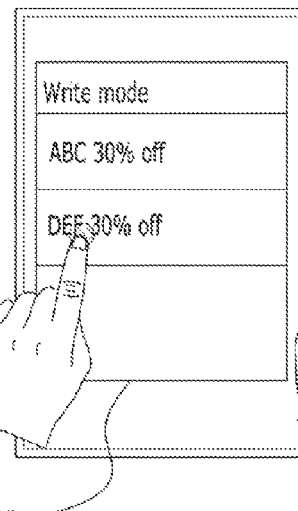
Figure 34C:
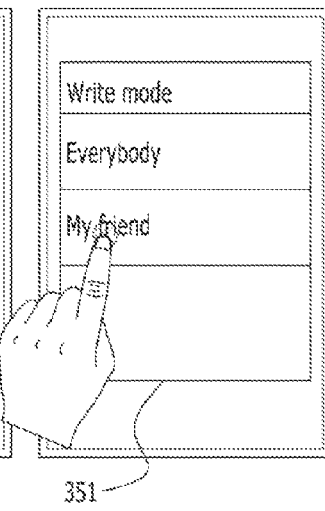
Figure 34D:
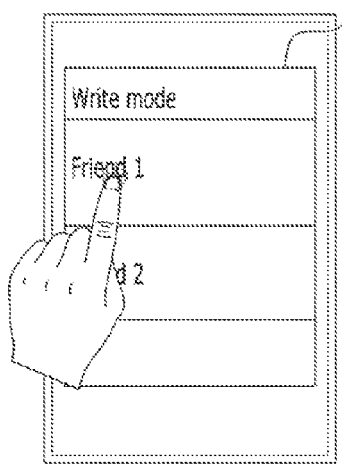
Figure 34E:
Figure 34F:
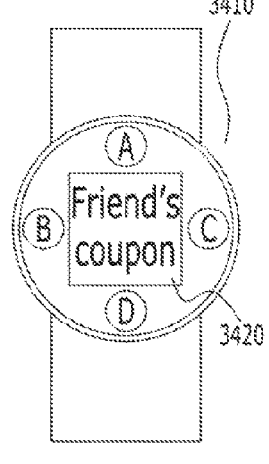

Referring to FIGS. 33A and 33B, a list of menus provided by the DS is displayed through the touchscreen 351 of the DS [FIG. 33A]. In this case, if there is a coupon provided through the DS in each item, coupon indicators 3311 and 3322 can be displayed next to the corresponding items, respectively. In case of a new coupon 3311, an alphabet 'N' can be included in the corresponding indicator in order to indicate the new coupon 3311. In case of a coupon 3322 of which validity expiration is imminent, alphabet 'E' can be included. Of course, the grant of alphabet is exemplary. And, it is a matter of course that a status of a coupon can be displayed in various ways. If a user selects an electronic device item, a place for using the corresponding coupon can be displayed on a map [FIG. 33B]. In this case, if the user inputs a $1^{st}$ touch and a $2^{nd}$ touch, information of a wearable device is displayed and the corresponding coupon information can be transmitted to the wearable device as well.

FIGS. 34A to 34F are diagrams for one example of a method of transmitting a coupon to another device according to another embodiment of the present invention.

Referring to FIGS. 34A to 34F, a user can select a write mode from the menu of DS in order to leave a coupon for a friend through the DS. Hence, a sub-menu of the write mode can be displayed [FIG. 34A]. In doing so, if the user selects Coupon, a list of coupons, which can be provided through the DS, can be displayed [FIG. 34B]. If the coupon is selected, a menu for selecting a transmission target can be displayed [FIG. 34C]. If Friend is selected, the DS makes a request for a friend list (e.g., phonebook, mail address book, messenger address book, etc.) to a connected wearable device and then receives the friend list. The DS can display the received friend list [FIG. 34D]. If a friend is selected from the friend list, a coupon transmission can be reserved in the DS through a final check [FIG. 34E]. Thereafter, if a mobile terminal or wearable device having an identification information corresponding to the selected friend is connected to the DS, the DS can control a message 3420, which notifies a presence of a coupon reserved by the user to be sent, to be displayed on a device 3410 of the selected friend [FIG. 34F].

In the example shown in FIG. 34, the coupon is mentioned, by which the present invention is non-limited. For example, a photo, a voice recording, a text or a combination thereof is saved in the DS by specifying a recipient. If a device of the specified recipient is connected to the DS, such information can be transmitted to the corresponding device.

Figure 35A:
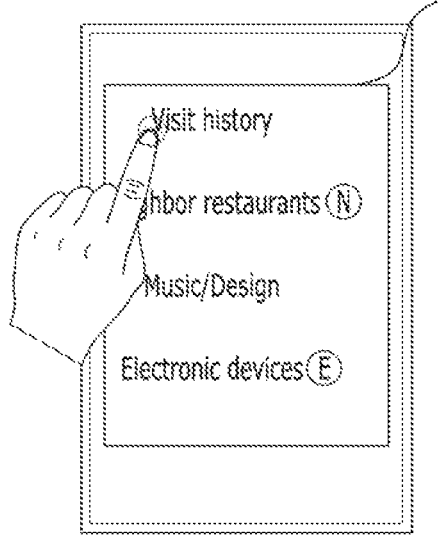
FIGS. 35A and 35B are diagrams for one example of a configuration of displaying a visit history on an external display device according to another embodiment of the present invention.
Figure 35B:
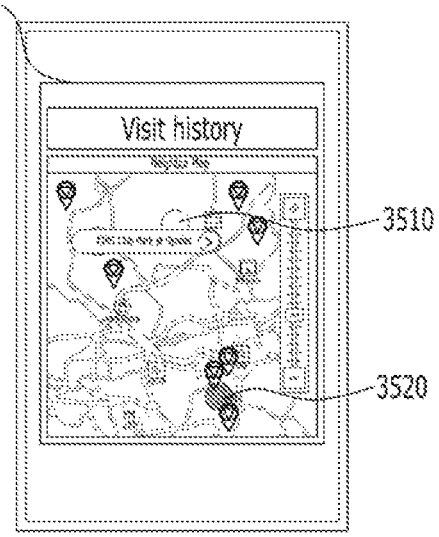

FIGS. 35A and 35B are diagrams for one example of a configuration of displaying a visit history on an external display device according to another embodiment of the present invention.

Referring to FIG. 35A, when a list of menus provided by the DS is displayed through the touchscreen 351 of the DS, if a visit history menu is selected, the DS makes a request for a moving path (GPS) information to a wearable device and is then able to receive the corresponding information. Hence, referring to FIG. 35B, an area visited by a user can be displayed on a DS-nearby map through an indicator 3510. Of course, a location, from which the user downloads a coupon, can be displayed through an indicator as well as the directly visited location displayed on GPS. And, a recommended location set by a friend through a method similar to that shown in FIGS. 34A and 34B can be displayed through an indicator 3520.

In the following description, a method of determining whether a wearable device is put on and a method of informing a user whether a wearable device is put on, which are applicable to embodiments of the present invention, are explained in detail with reference to FIGS. 36A to 36D and FIGS. 37A to 37C.

FIGS. 36A to 36D are diagrams for one example of a method of determining whether a wearable device is put on, which is applicable to embodiments of the present invention.

Figure 36A:
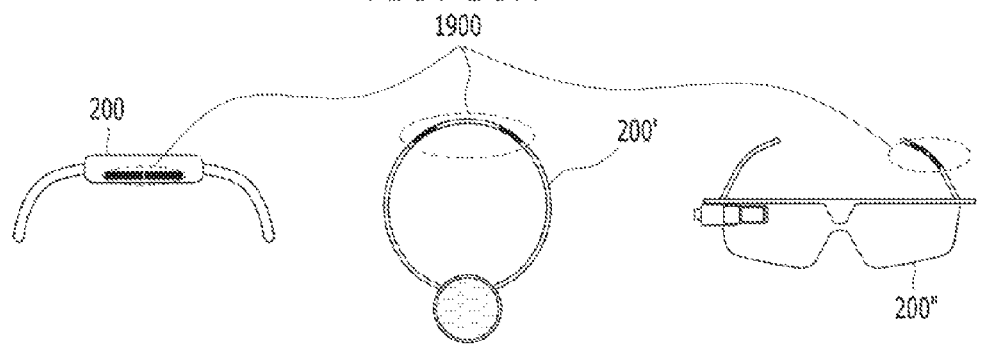
FIGS. 36A to 36D are diagrams for one example of a method of determining whether a wearable device is put on, which is applicable to embodiments of the present invention.

Referring to FIG. 36A, a wearing detecting means 3600 can be provided to a part (e.g., a backside of a body of a watch type 200, a backside of a chain of a necklace type 200', an inner lateral side of a glasses temple of a glasses type 200", etc.) of each wearable device coming contact with a human body. The wearing detecting means 3600 can employ a capacitive detection scheme, an optical detection scheme or the like. In order to enhance wearable comfort, the wearing detecting means 3600 can include a flexible material.

Figure 36B:
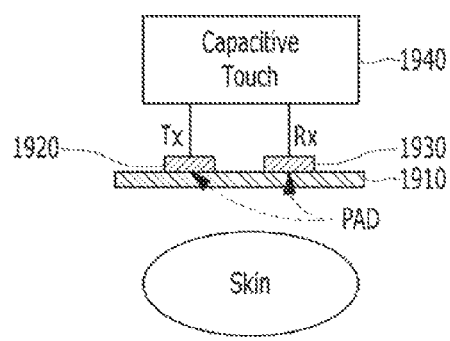
Figure 36C:
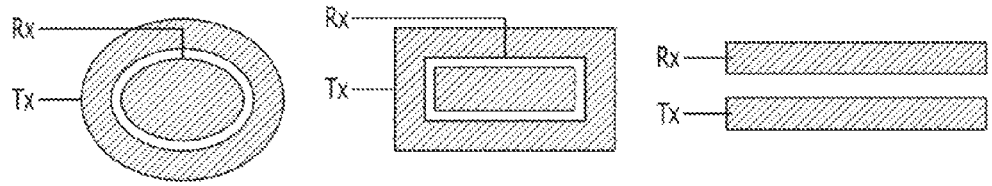

According to the capacitive detecting scheme, referring to FIG. 36B, a Tx electrode 3620 and an Rx electrode 3630 are arranged on an electrode pad 3610 in a manner of being spaced apart from each other. And, a detecting unit 3640 can determine a capacitance change generated between the electrodes when the pad 3610 comes in contact with a skin. The arranged configuration of the electrodes can be variously modifiable if necessary [FIG. 36C].

Figure 36D:
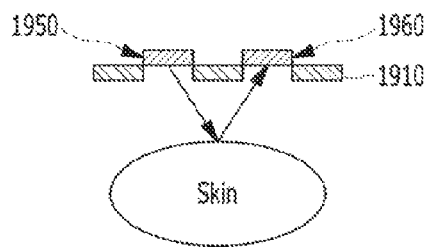

According to the optical detection scheme, referring to FIG. 36D, a light receiving unit 3660 detects a change attributed to an effect that a light applied by a light emitting unit 3650 to an opening formed in a pad 3610 is reflected by a skin, whereby a presence or non-presence of wearing can be detected.

Anti-reflection coating can be applied to a light-passing path to prevent from being externally seen. And, a physical filter can be applied to the light receiving unit 3660 to cut off influence of other external lights.

In order to determine whether the light applied by the light emitting unit is reflected by the skin or another substance, the light emitting unit can emit light in specific pattern and light wavelengths can be implemented diversely. In this case, the light receiving unit can determine whether the light from the light emitting unit is reflected by the skin more accurately by analyzing a pattern of a per-wavelength incident reflective light for each wavelength.

In addition to the capacitive detection scheme and the optical detection scheme, it is able to detect a presence or non-presence of wearing from a presence or non-presence of a user's motion. Information on the presence or non-presence of the wearing determined by one of the above-described schemes can be transmitted to a mobile terminal from each wearable device and can be also provided to a user visually through the mobile terminal or the wearable device. This is described in detail with reference to FIG. 37 as follows.

Figure 37A:
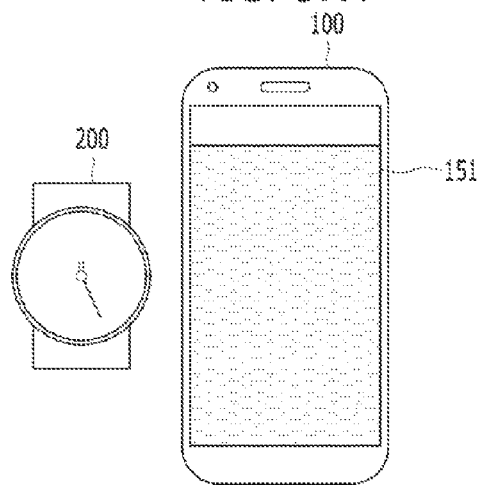
FIGS. 37A to 37C are diagrams for one example of a method of informing a user whether a wearable device is put on, which is applicable to embodiments of the present invention.
Figure 37B:
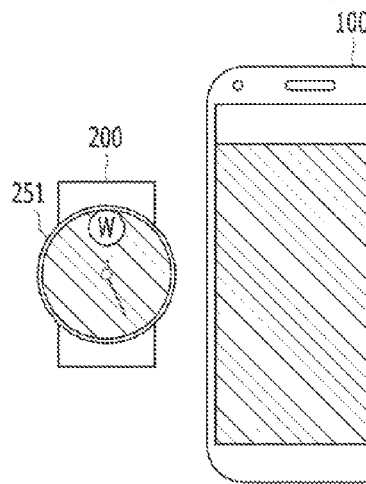
Figure 37C:
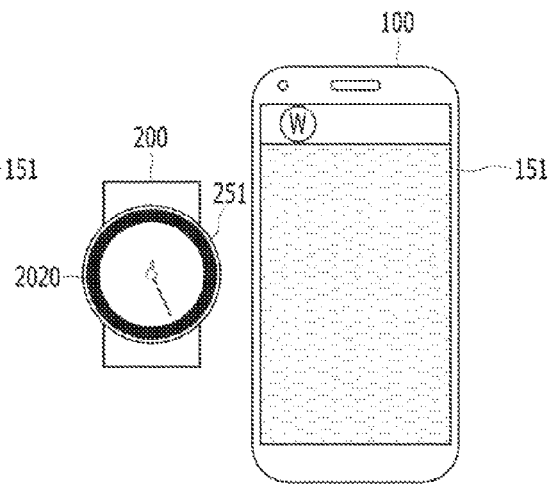

FIGS. 37A to 37C are diagrams for one example of a method of informing a user whether a wearable device is put on, which is applicable to embodiments of the present invention.

Referring to FIG. 37A, a watch type wearable device 200 and a mobile terminal 100 are connected to each other but the watch type wearable device 200 is not put on.

Referring to FIG. 37B, if it is determined that a user wears the watch type wearable device 200, a color of a background screen of a touchscreen 251 of the watch type wearable device 200 and a color of a background screen of a touchscreen 151 of the mobile terminal 100 can be changed for prescribed duration. And, an indicator 3710 indicating that the user wears the corresponding device can be displayed on a prescribed region (e.g., a top indicator region, etc.) of each of the touchscreens.

Referring to FIG. 37C, after lapse of a prescribed time, the background color change of each of the touchscreens can disappear. Moreover, the indicator 3710 shown in FIG. 37B disappears from the touchscreen 251 of the watch type wearable device 200 and a prescribed visual effect 3720 can be given to the edge of the touchscreen 251.

Particularly, the presence or non-presence of the wearing described with reference to FIGS. 36A to 36D and FIGS. 37A to 37C can become the precondition for FIG. 7B and FIGS. 15A to 18D.

In the following description, a basic assumption for a connection (e.g., a paring, etc.) between a wearable device and a mobile terminal, which is applicable to embodiments of the present invention, is explained.

According to the present invention, when a wearable device is put on or a power of the wearable device is turned on, the wearable device can automatically attempt a reconnection with a previously paired device. And, the wearable device can output the success/failure depending on a result of the attempt in various ways (e.g., visual information, vibration, audio, etc.). The reattempt of the pairing can be performed by shaking the wearable device, re-wearing the wearable device, resetting a power, or the like. If a pairing is disconnected due to a weak radio signal, a reconnection to the mobile terminal can be reattempted by predetermined time intervals. If the wearable device is not put on, the reconnection may not be attempted in accordance with settings.

Moreover, a wearable device paired with a mobile terminal can manage/update connection information in flag state as shown in Table 1.

TABLE 1

| Paring flag | Wearing flag | Remarks |
| --- | --- | --- |
| 1 | 0 | Not wearing in wireless connected state |
| 1 | 1 | Wearing in wireless connected state |
| 0 | 1 | Wearing in wireless disconnected state |

Meanwhile, it is a matter of course that the flag states shown in Table 1 can be visually represented through indicators of the respective devices.

It will be apparent to those skilled in the art that various modifications and variations can be specified into other form(s) without departing from the spirit or scope of the inventions.

According to one embodiment of the present invention, the above-described methods can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet). Moreover, the computer may include a controller 180 of a terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a transceiver configured to communicate with at least one wearable device;
a touchscreen configured to display information and to receive touch inputs; and
a controller circuit configured to:
turn on the touchscreen and cause the touchscreen to display information of the at least one wearable device in response to a first touch input and a second touch input,
wherein the first touch input is received via the touchscreen while the touchscreen is in a turned-off status, and the second touch input is received via the touchscreen while the first touch input is maintained on the touchscreen, and
wherein the at least one wearable device is wirelessly connected with the mobile terminal via the transceiver.

2. The mobile terminal of claim 1, wherein when a plurality of wearable devices are wirelessly connected to the mobile terminal, the controller circuit is further configured to arrange the information on the touchscreen based on whether each the plurality of wearable devices is worn on a body part.

3. The mobile terminal of claim 2, wherein the controller circuit is further configured to cause the touchscreen to display the information of the plurality of wearable devices in a rotating manner in response to a scroll command received via the touchscreen such that information of each of the plurality of wearable devices is displayed according to the rotation of the displayed information.

4. The mobile terminal of claim 1, wherein the information of the at least one wearable device comprises information of at least one application installed in the at least one wearable device.

5. The mobile terminal of claim 4, wherein:
the information of the at least one wearable device further comprises at least one graphic object representing at least one type of the at least one wearable device; and
at least one icon representing the at least one application is enclosed within a boundary of the at least one graphic object such that a plurality of graphic objects are displayed on the touchscreen when a plurality of wearable devices are wirelessly connected to the mobile terminal and a plurality of icons are included within a boundary of a corresponding one of the plurality of graphic objects when a plurality of applications are installed in a corresponding one of the plurality of wearable devices.

6. The mobile terminal of claim 5, wherein the controller circuit is further configured to cause the touchscreen to display detailed information of an application installed in the corresponding one of the plurality of wearable devices in response to selection of an icon corresponding to the application from among the plurality of icons included within the boundary of the corresponding one of the plurality of graphic objects.

7. The mobile terminal of claim 5, wherein in response to selection of a first icon corresponding to a first application installed in a first wearable device among the plurality of wearable devices followed by movement of the selected first icon to a first region of the touchscreen, the controller circuit is further configured to install the first application in the mobile terminal or in at least one of the plurality of wearable devices except for the first wearable device based on where the first region is located on the touchscreen.

8. The mobile terminal of claim 7, wherein when the first region is located at an edge region of the touchscreen, in response to the selection of the first icon and the movement of the selected first icon to the first region, the controller circuit is further configured to:
    cause the touchscreen to display, on a second region of the touchscreen, an icon corresponding to each of at least one application installed in the mobile terminal, a boundary of the second region including the first region;
    install the first application in the mobile terminal; and
    cause the touchscreen to display, on the second region of the touchscreen, an additional icon corresponding to the first application when the installation of the first application in the mobile terminal starts or is completed.

9. The mobile terminal of claim 5, wherein in response to selection of a first icon corresponding to a first application installed in a first wearable device among the plurality of wearable devices followed by movement of the selected first icon to another region of the touchscreen, the controller circuit is further configured to delete the first application from the first wearable device.

10. The mobile terminal of claim 1, wherein the controller circuit is further configured to:
    determine whether the connected at least one wearable device is on a body part;
    cause the touchscreen to display an icon indicating presence of the connected at least one wearable device on the body part; and
    cause the touchscreen to display the information of the connected at least one wearable device in response to selection of the icon.

11. A method of controlling a mobile terminal comprising a touchscreen, the method comprising:
    communicating with at least one wearable device; and
    turning on the touchscreen and displaying information of the at least one wearable device in response to a first touch input and a second touch input, wherein the first touch input is received via the touchscreen while the touchscreen is in a turned-off status, and the second touch input is received via the touchscreen while the first touch input is maintained on the touchscreen, and wherein the at least one wearable device is wirelessly connected with the mobile terminal.

12. The method of claim 11, wherein when a plurality of wearable devices are wirelessly connected to the mobile terminal, the method further comprises arranging the information on the touchscreen based on whether each the plurality of wearable devices is worn on a body part.

13. The method of claim 12, further comprising displaying the information of the plurality of wearable devices in a rotating manner in response to a scroll command received via the touchscreen such that information of each of the plurality of wearable devices is displayed according to the rotation of the displayed information.

14. The method of claim 11, wherein the information of the at least one wearable device comprises an information of at least one application installed in the at least one wearable device.

15. The method of claim 14, wherein:
    the information of the at least one wearable device further comprises at least one graphic object representing at least one type of the at least one wearable device; and
    at least one icon representing the at least one application is enclosed within a boundary of the at least one graphic object such that a plurality of graphic objects are displayed on the touchscreen when a plurality of wearable devices are wirelessly connected to the mobile terminal and a plurality of icons are included within a boundary of a corresponding one of the plurality of graphic objects when a plurality of applications are installed in a corresponding one of the plurality of wearable devices.

16. The method of claim 15, further comprising displaying detailed information of an application installed in the corresponding one of the plurality of wearable devices in response to selection of an icon corresponding to the application from among the plurality of icons included within the boundary of the corresponding one of the plurality of graphic objects.

17. The method of claim 15, further comprising in response to selection of a first icon corresponding to a first application installed in a first wearable device among the plurality of wearable devices followed by movement of the selected first icon to a first region of the touchscreen, installing the first application in the mobile terminal or in at least one of the plurality of wearable devices except for the first wearable device based on where the first region is located on the touchscreen.

18. The method of claim 17, wherein when the first region is located at an edge region of the touchscreen, in response to the selection of the first icon and the movement of the selected first icon to the first region, the method further comprises:
    displaying, on a second region of the touchscreen, an icon corresponding to each of at least one application installed in the mobile terminal, a boundary of the second region including the first region;
    installing the first application in the mobile terminal; and
    displaying, on the second region of the touchscreen, an additional icon corresponding to the first application when the installation of the first application in the mobile terminal starts or is completed.

19. The method of claim 15, further comprising in response to selection of a first icon corresponding to a first application installed in a first wearable device among the plurality of wearable devices followed by movement of the selected first icon to another region of the touchscreen, deleting the first application from the first wearable device.

20. The method of claim 11, further comprising:
    determining whether the connected at least one wearable device is on a body part;
    displaying an icon indicating presence of the connected at least one wearable device on the body part; and
    displaying the information of the connected at least one wearable device in response to selection of the icon.

\* \* \* \* \*